(12) United States Patent
Hirose

(10) Patent No.: US 6,937,708 B2
(45) Date of Patent: Aug. 30, 2005

(54) TELEPHONE SERVICE METHOD AND TELEPHONE SERVICE APPARATUS

(75) Inventor: Yuichi Hirose, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 342 days.

(21) Appl. No.: 10/105,192

(22) Filed: Mar. 26, 2002

(65) Prior Publication Data
US 2003/0063721 A1 Apr. 3, 2003

(30) Foreign Application Priority Data
Sep. 28, 2001 (JP) .............................. 2001-304026

(51) Int. Cl.[7] .............................................. H04M 11/00
(52) U.S. Cl. ................... 379/93.12; 379/93.25; 379/201.01; 379/207.14; 379/67.1
(58) Field of Search .................... 379/93.12, 90.01, 379/93.17–93.28, 110.01, 142.01, 67.01, 88.13, 88.17, 201.01, 211.01, 211.02, 214.01, 207.14

(56) References Cited

U.S. PATENT DOCUMENTS 4,850,007 A * 7/1989 Marino et al.
5,321,740 A * 6/1994 Gregorek et al. .......... 379/67.1
6,052,438 A * 4/2000 Wu et al. ................... 379/67.1
6,385,308 B1 * 5/2002 Cohen et al. .............. 379/67.1
6,442,244 B1 * 8/2002 Fellingham et al. ..... 379/93.12

FOREIGN PATENT DOCUMENTS

JP 10032655 A 2/1998
JP 2000324271 A 11/2000

* cited by examiner

Primary Examiner—Wing F. Chan
(74) Attorney, Agent, or Firm—Staas & Halsey LLP

(57) ABSTRACT

A telephone service method and apparatus for providing a business advertisement to a caller of a telephone, comprising receiving a request for line connection from a phone of a caller, determining an identifier of the phone of a called party for which line connection is requested, judging whether the identifier of the called party is registered in a management table linking called party identifiers and business advertisements, and, when judging that the identifier of the called party is registered, sending a business advertisement linked with that identifier from business advertisements stored in a content database to the phone of the caller.

8 Claims, 33 Drawing Sheets

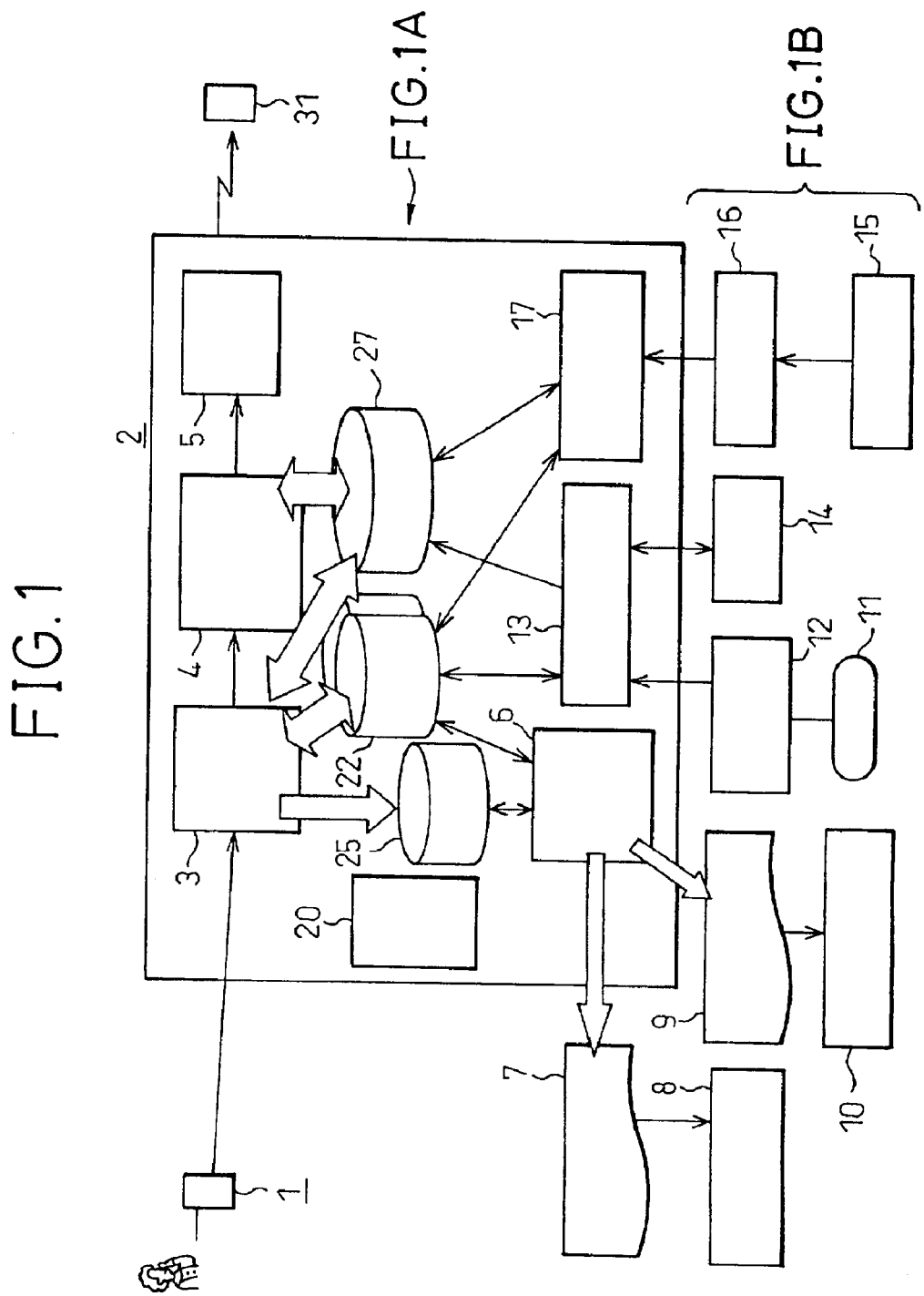

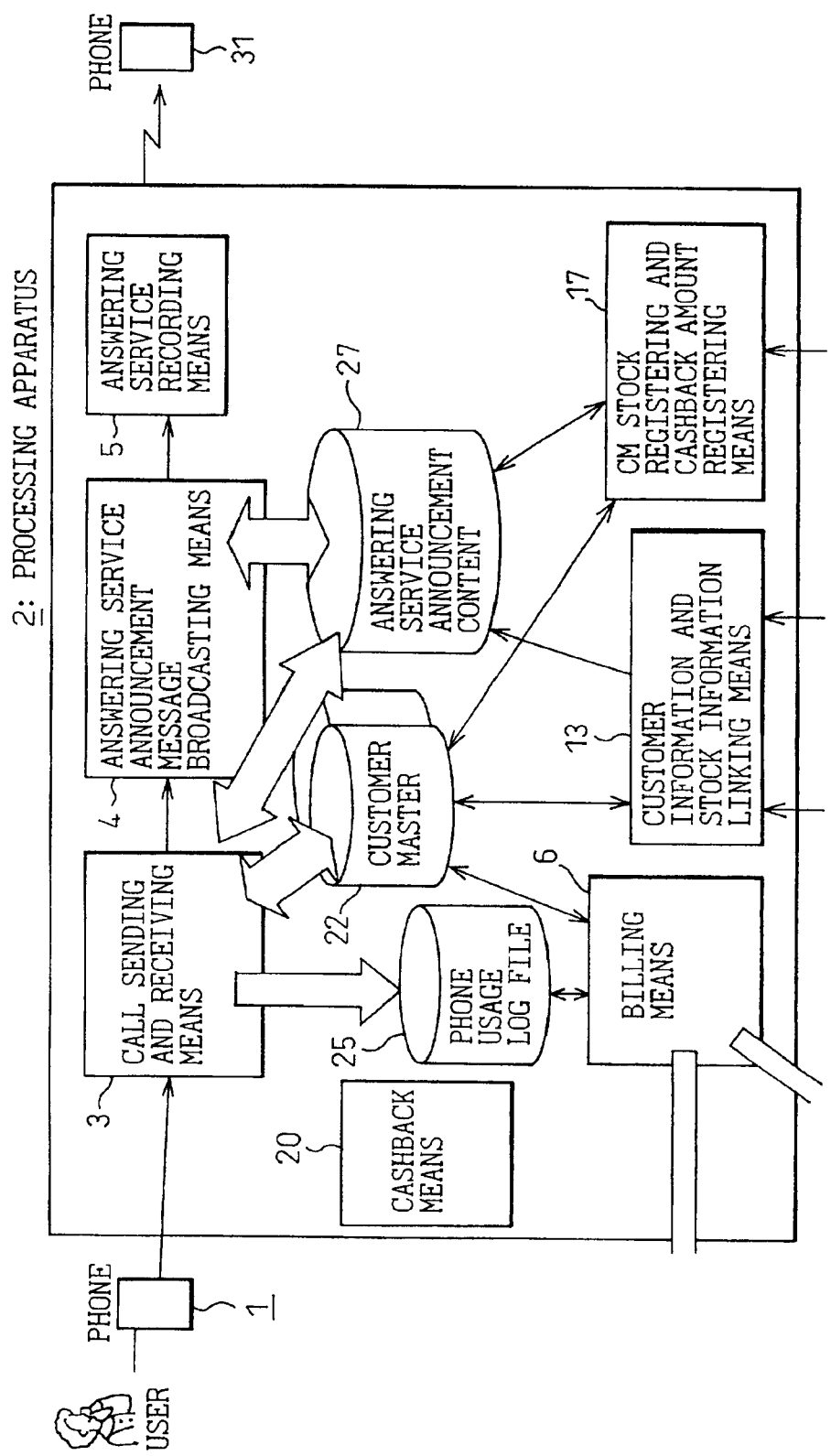

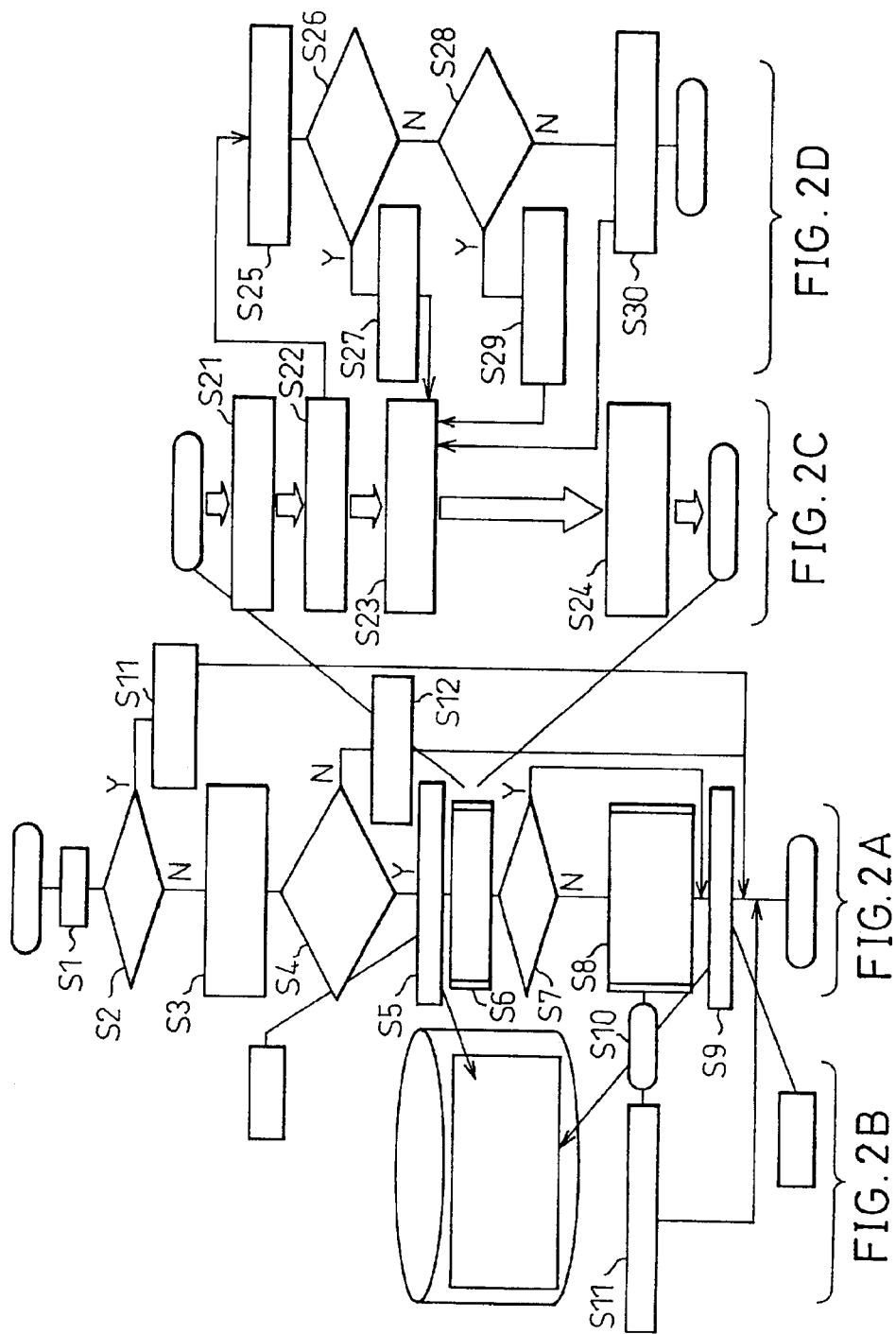

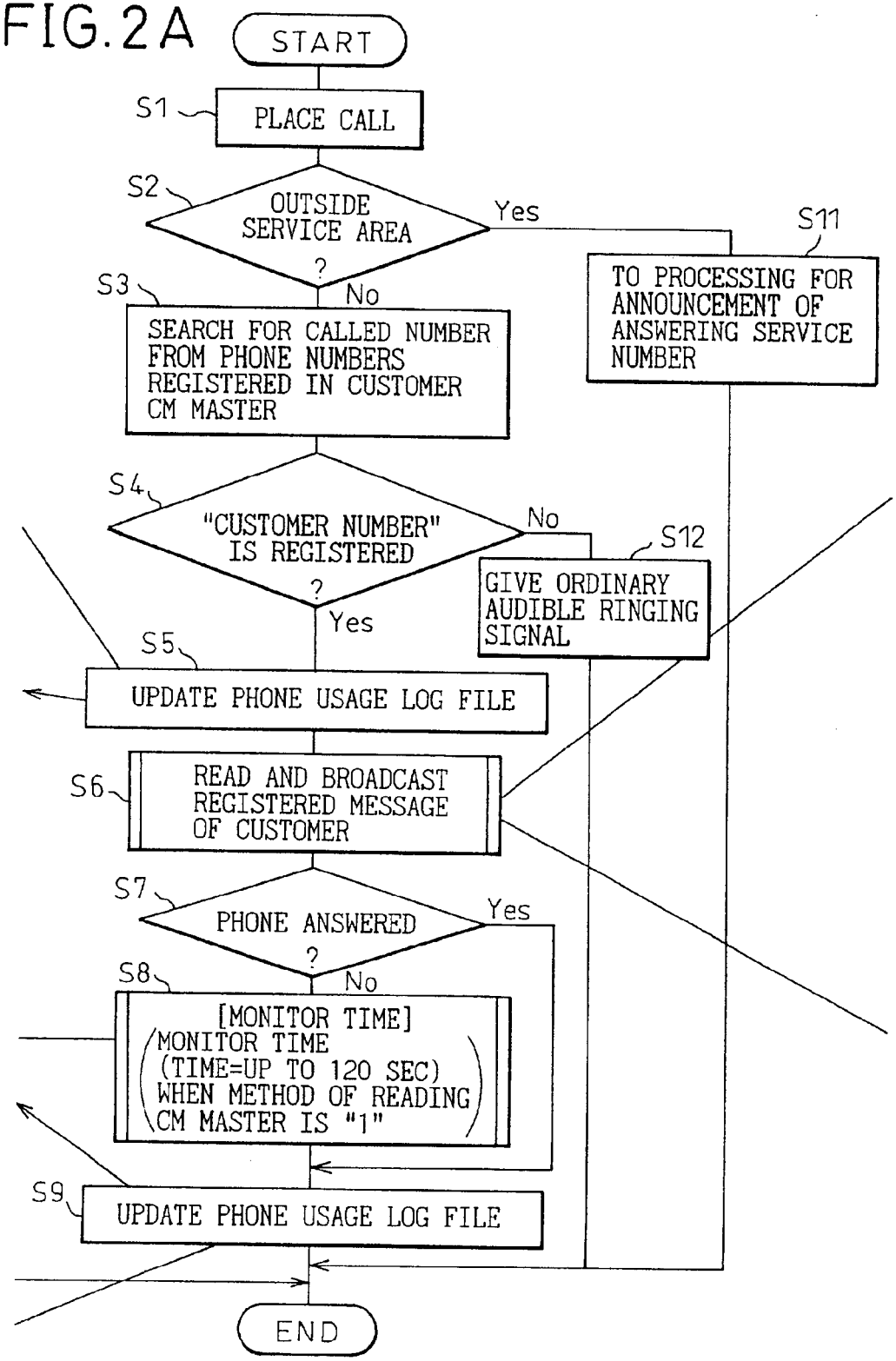

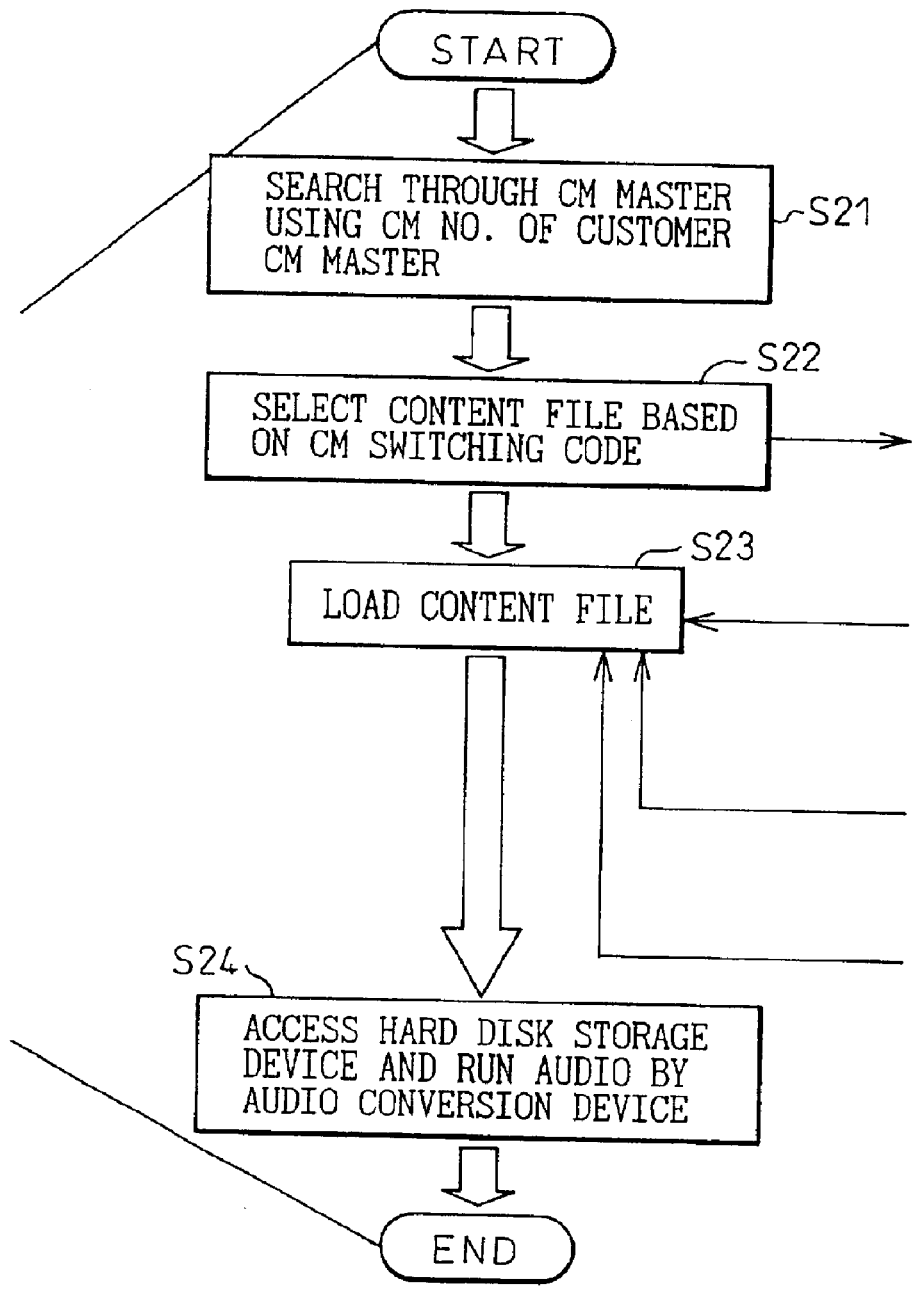

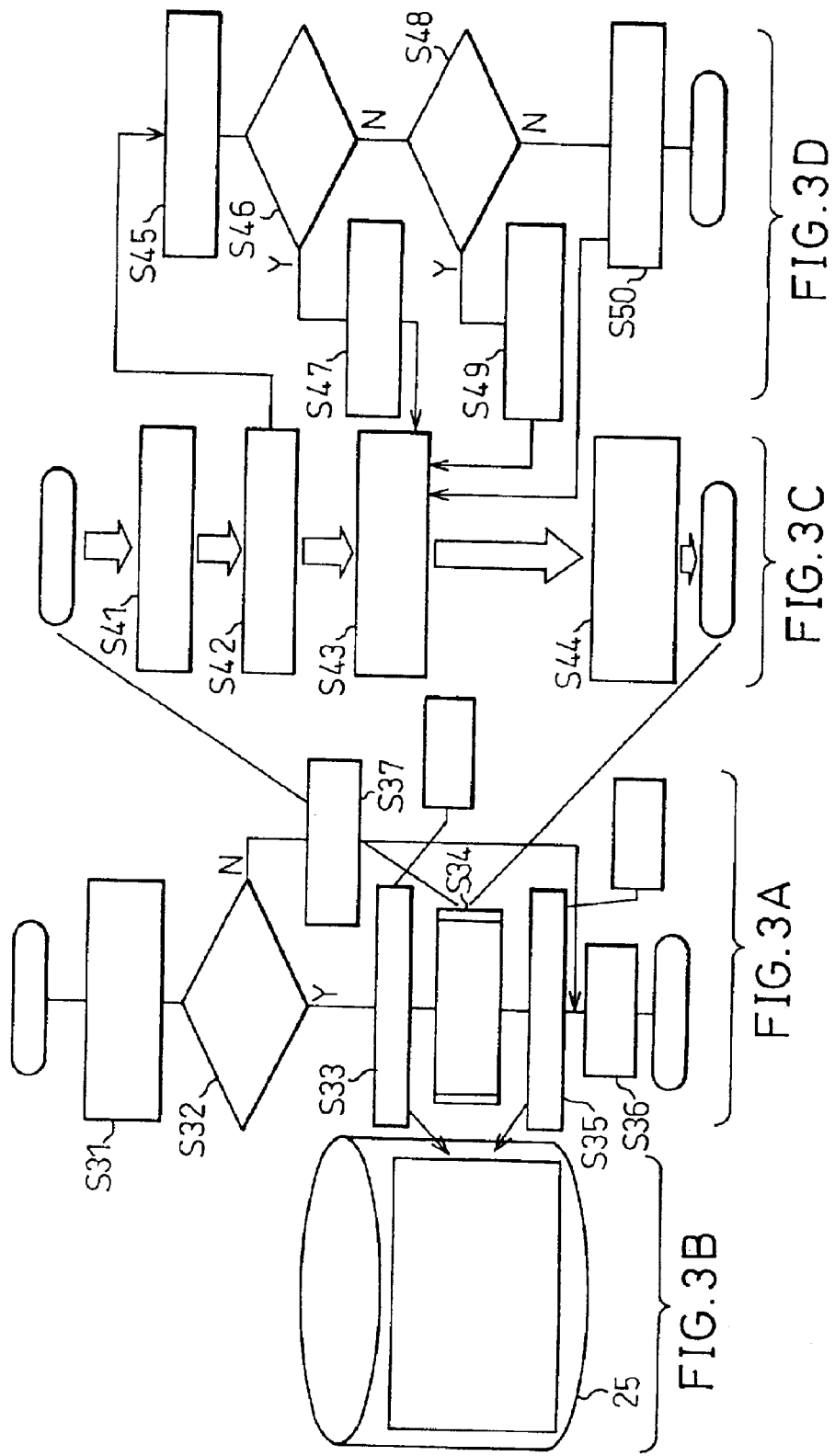

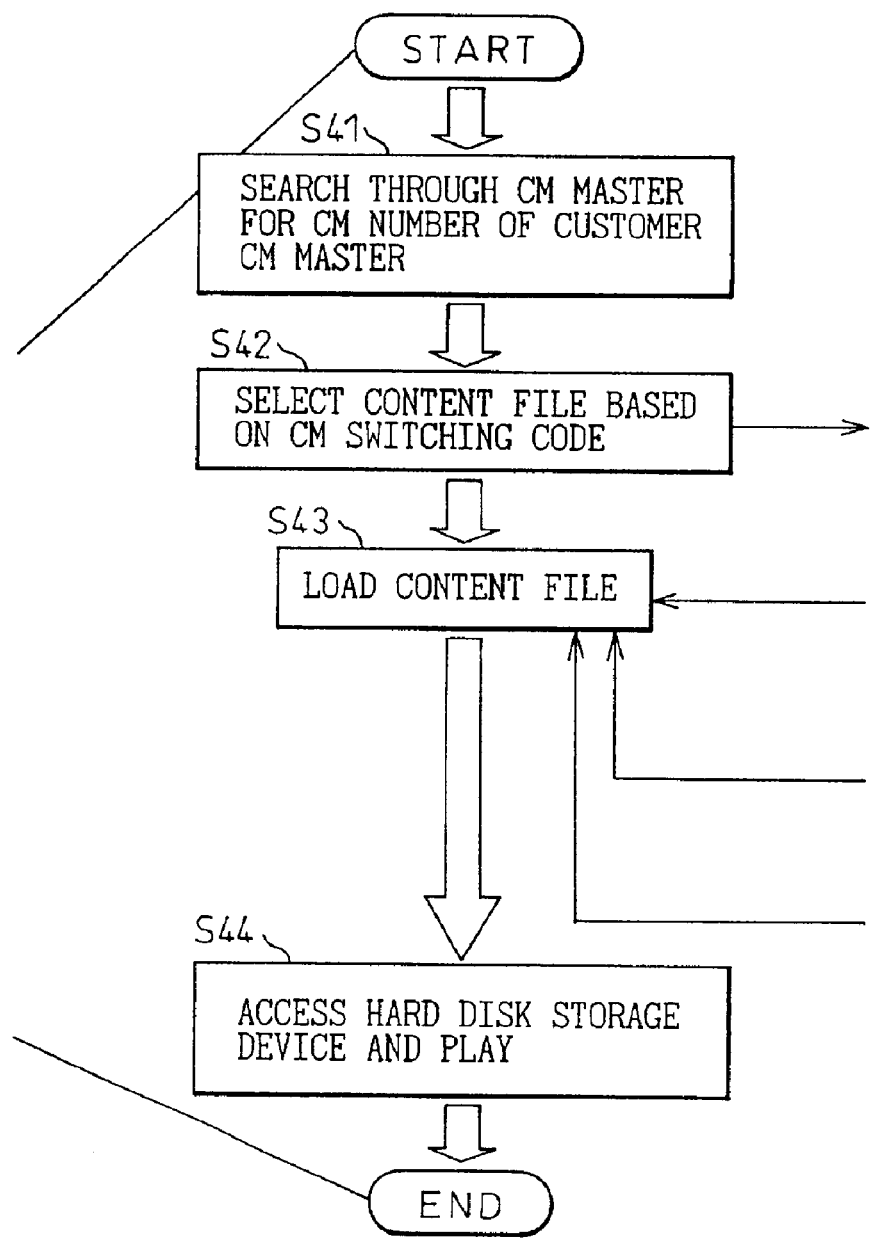

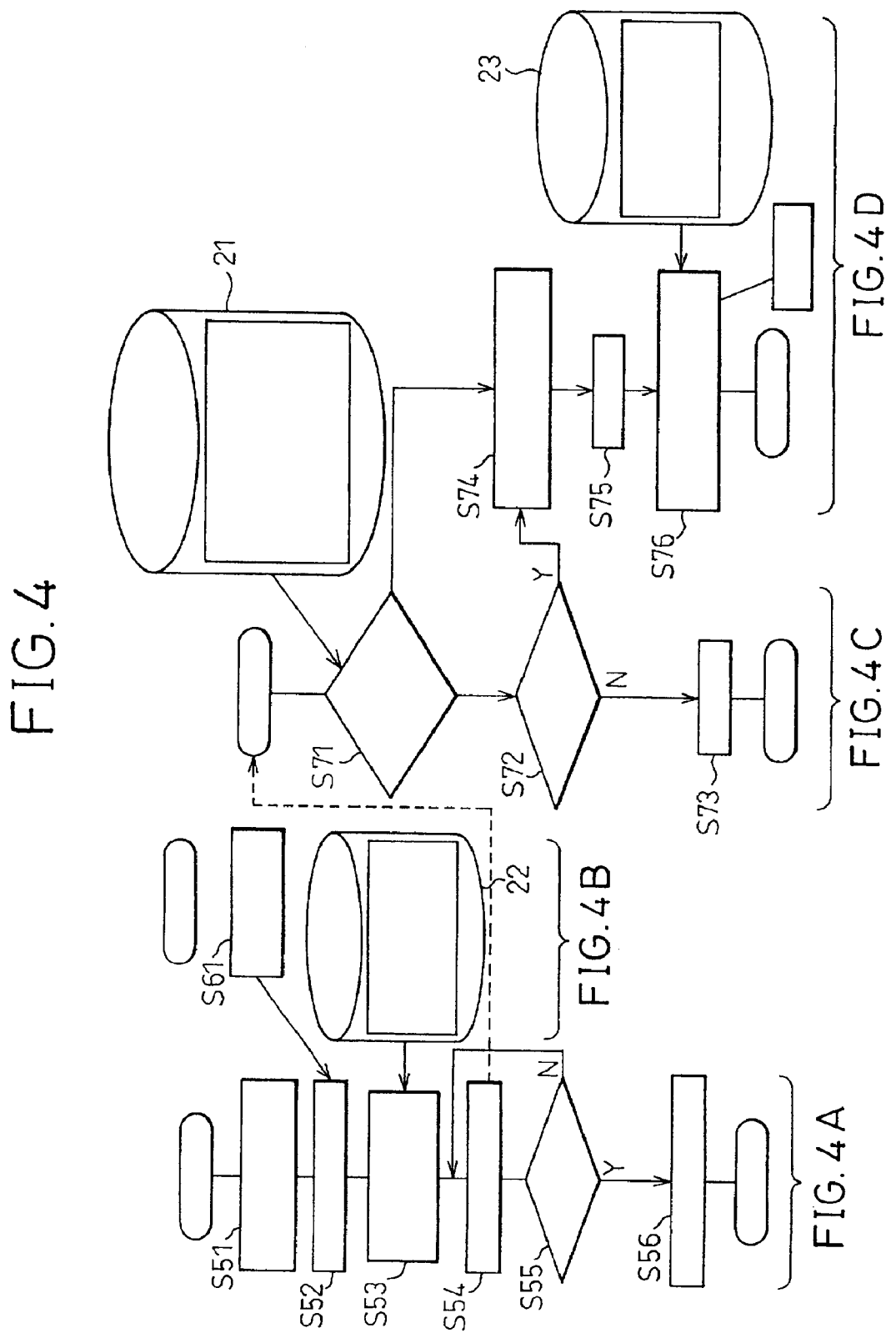

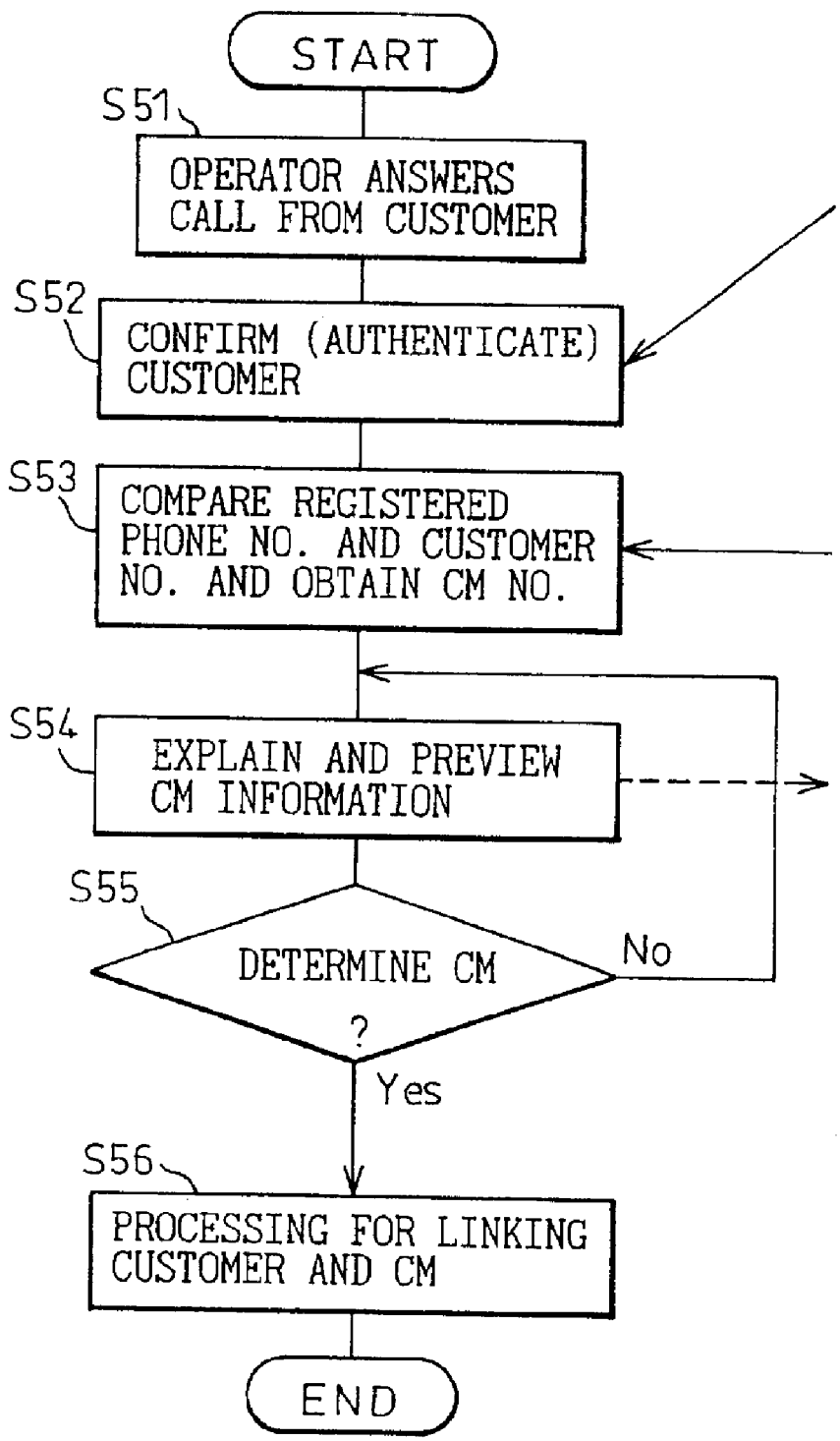

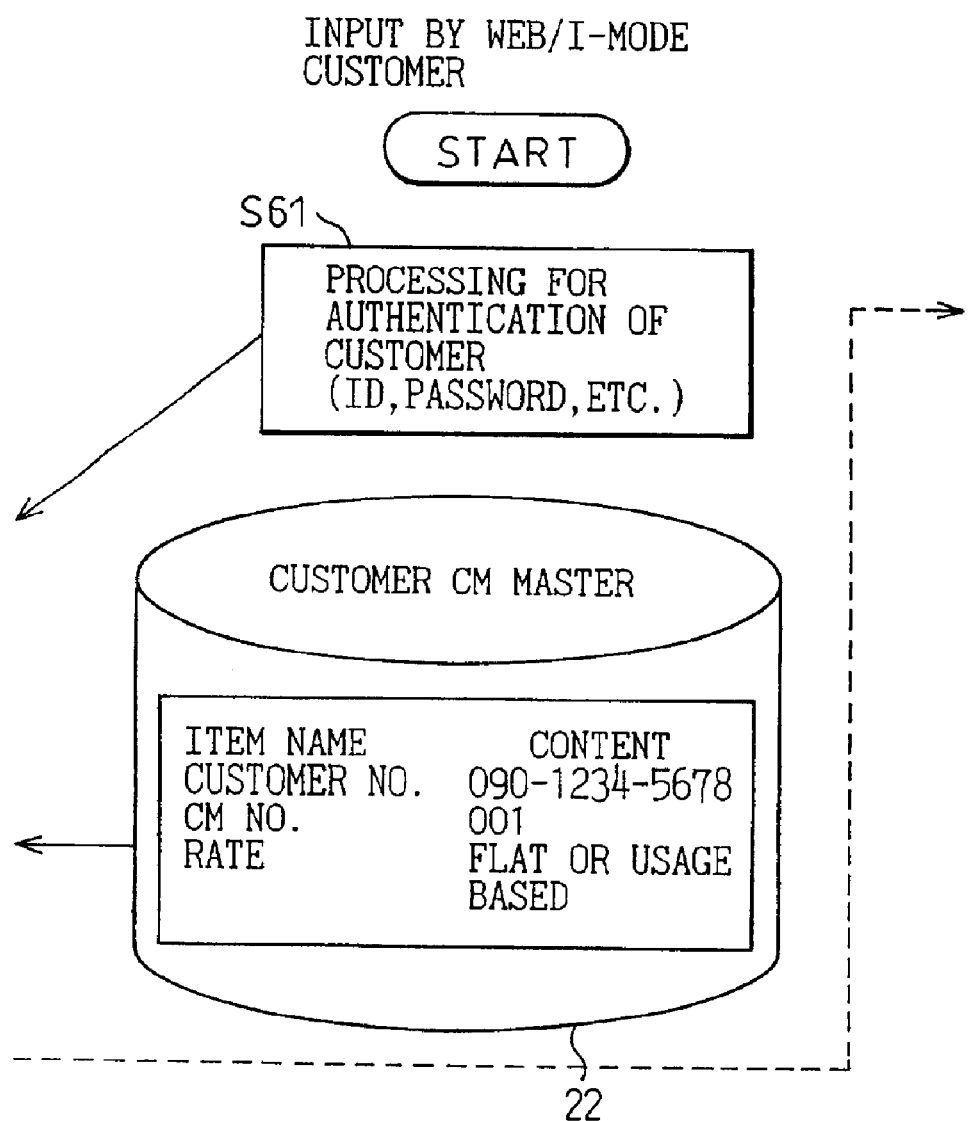

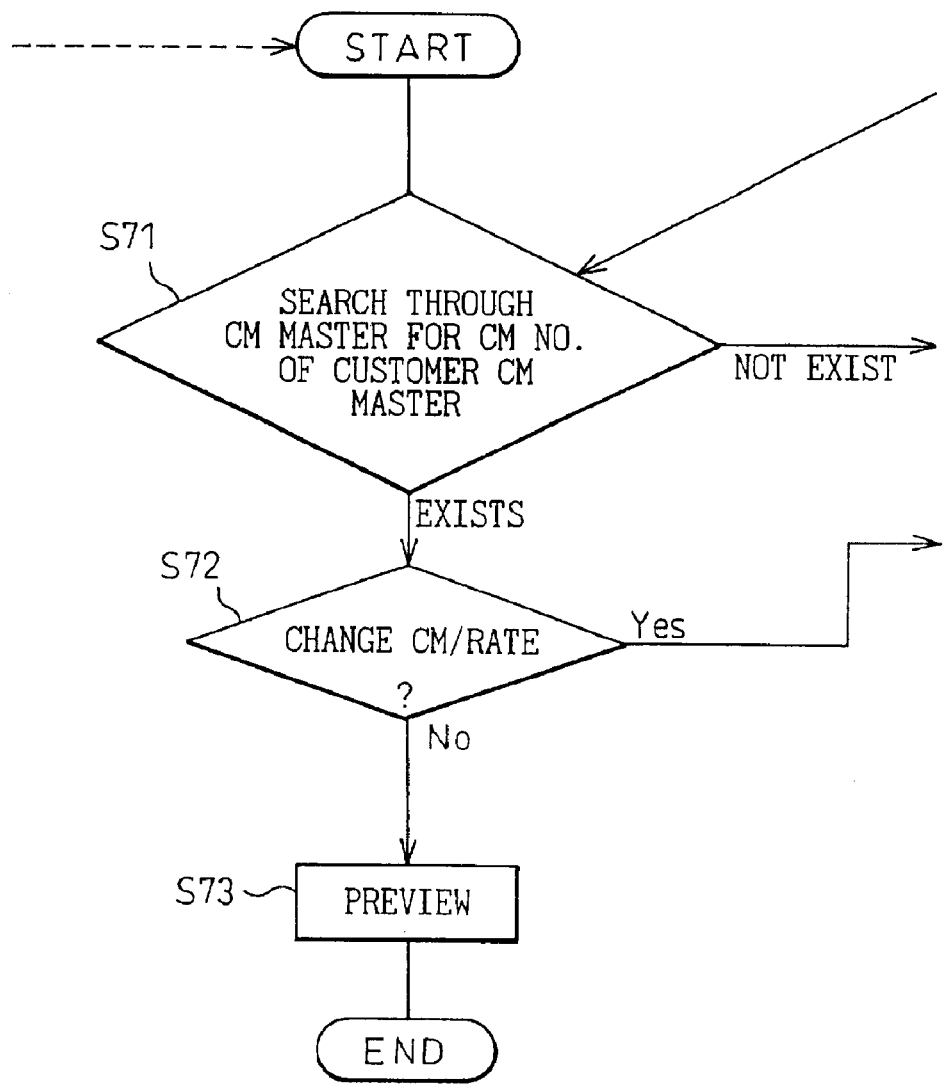

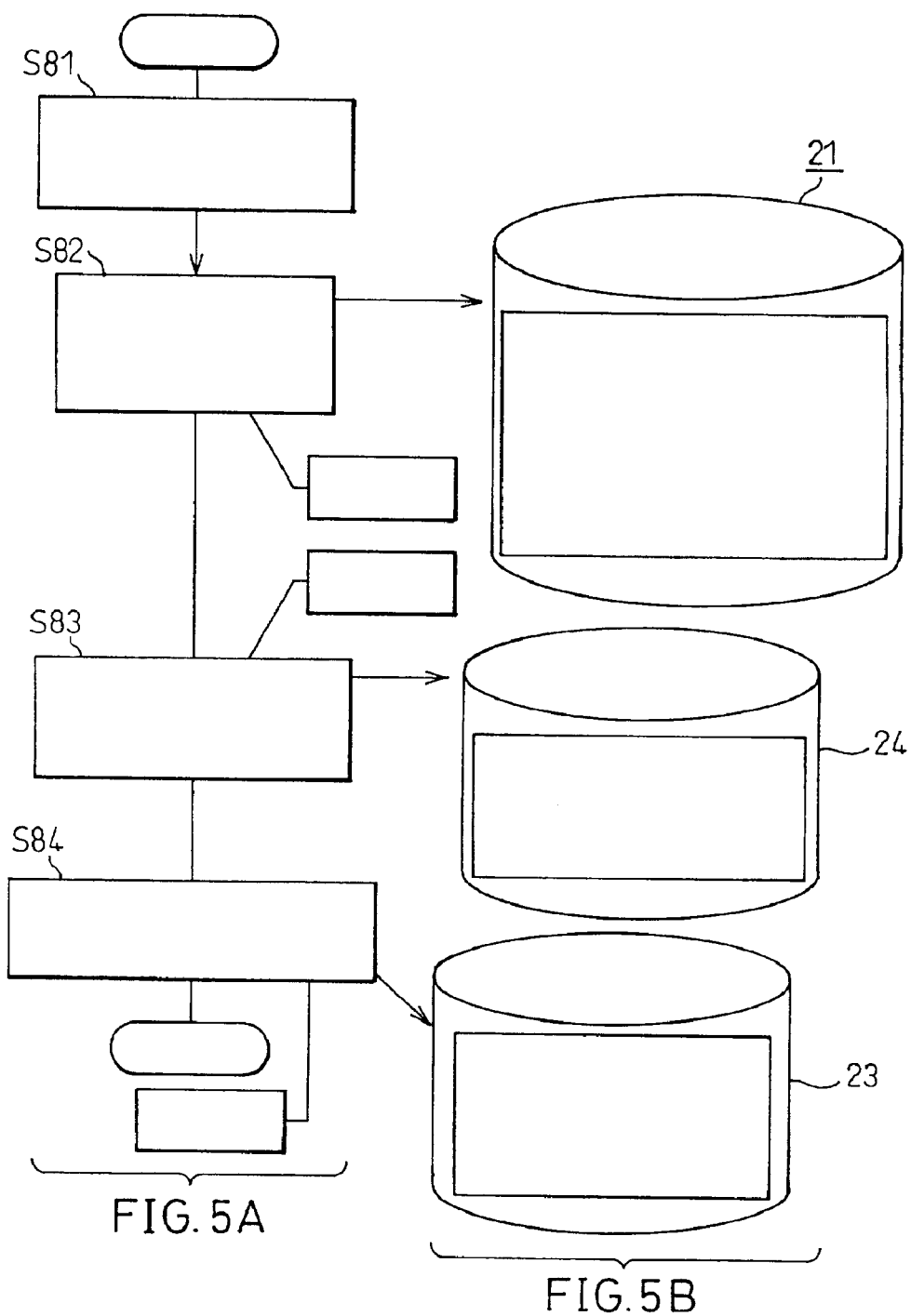

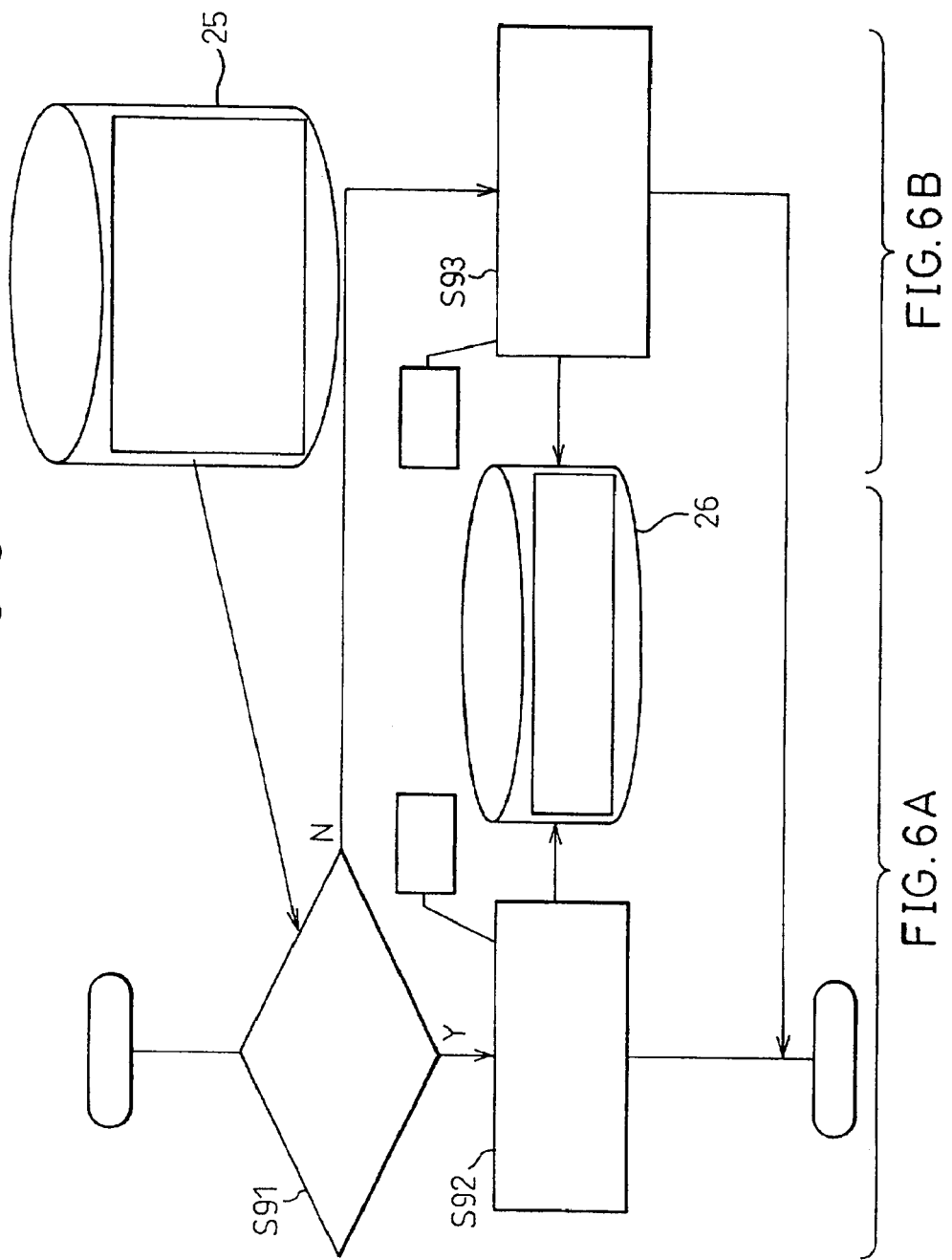

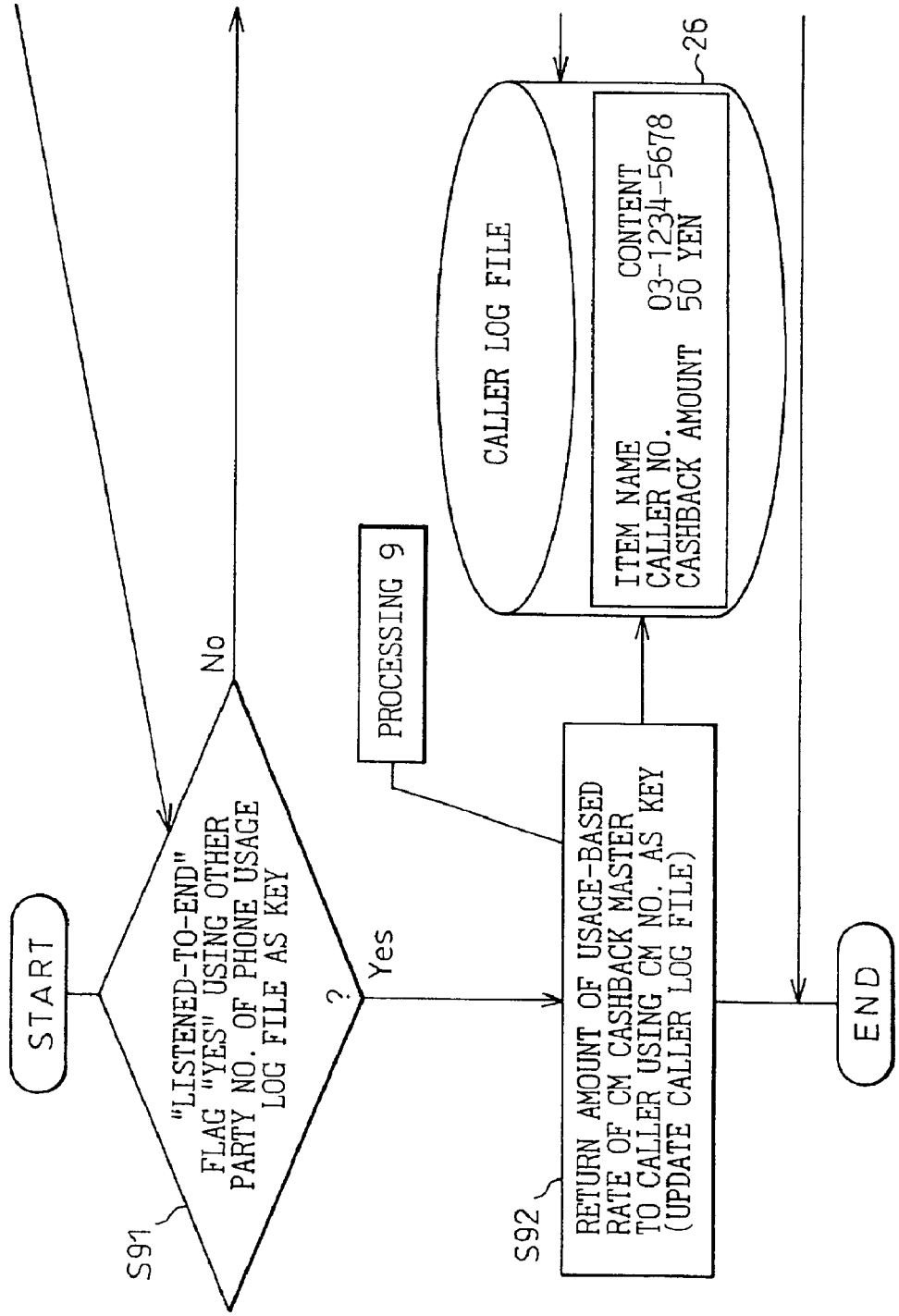

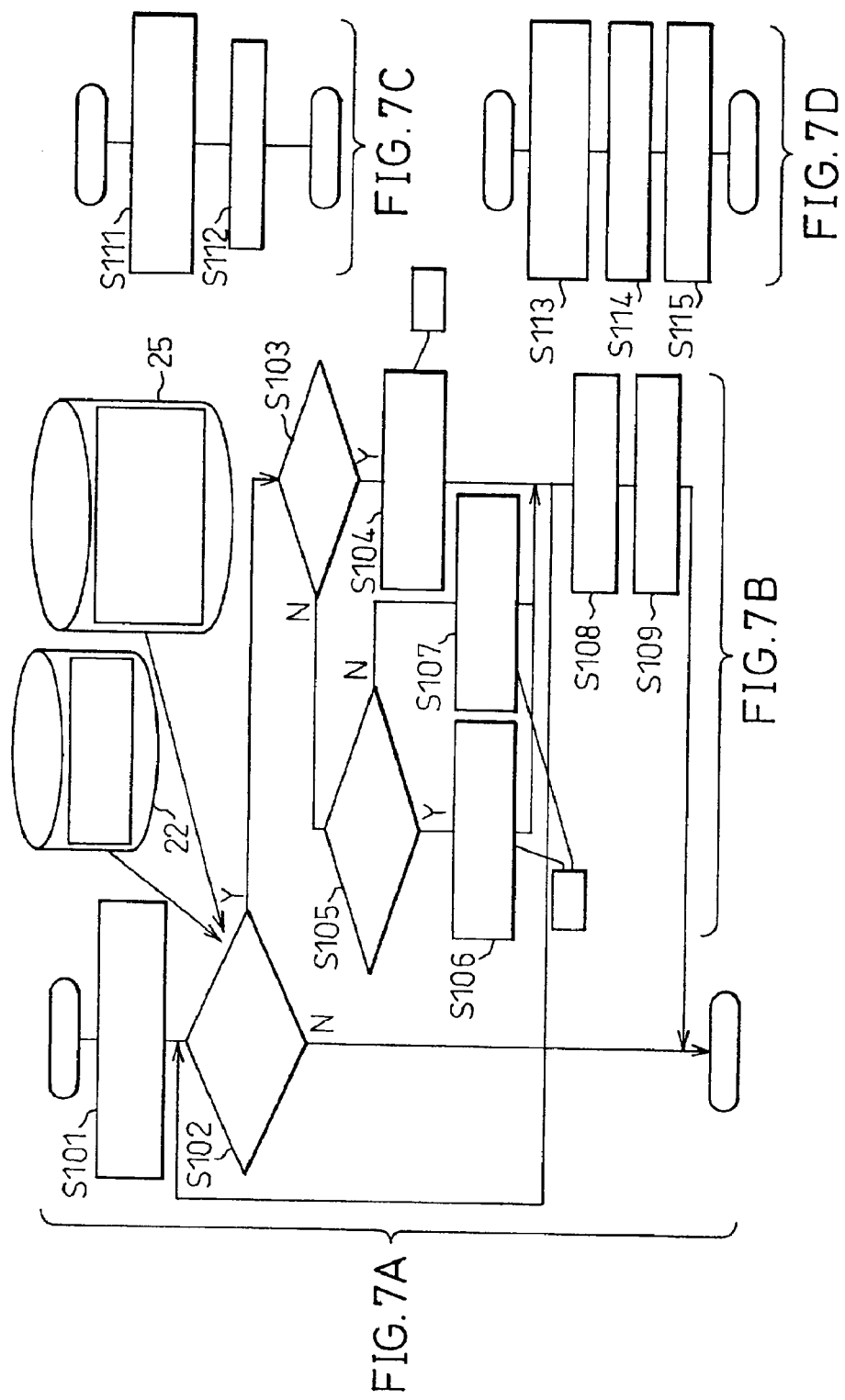

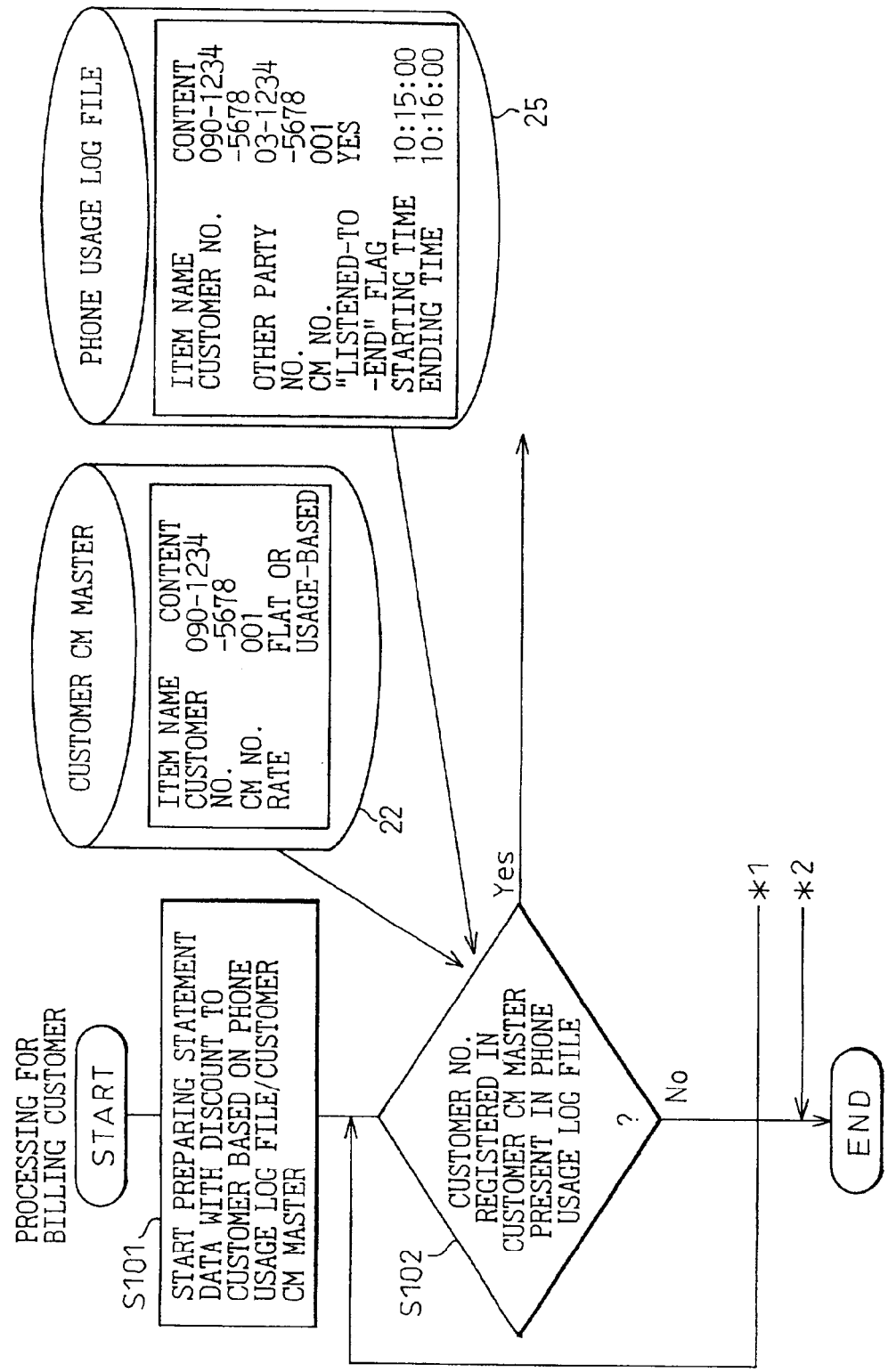

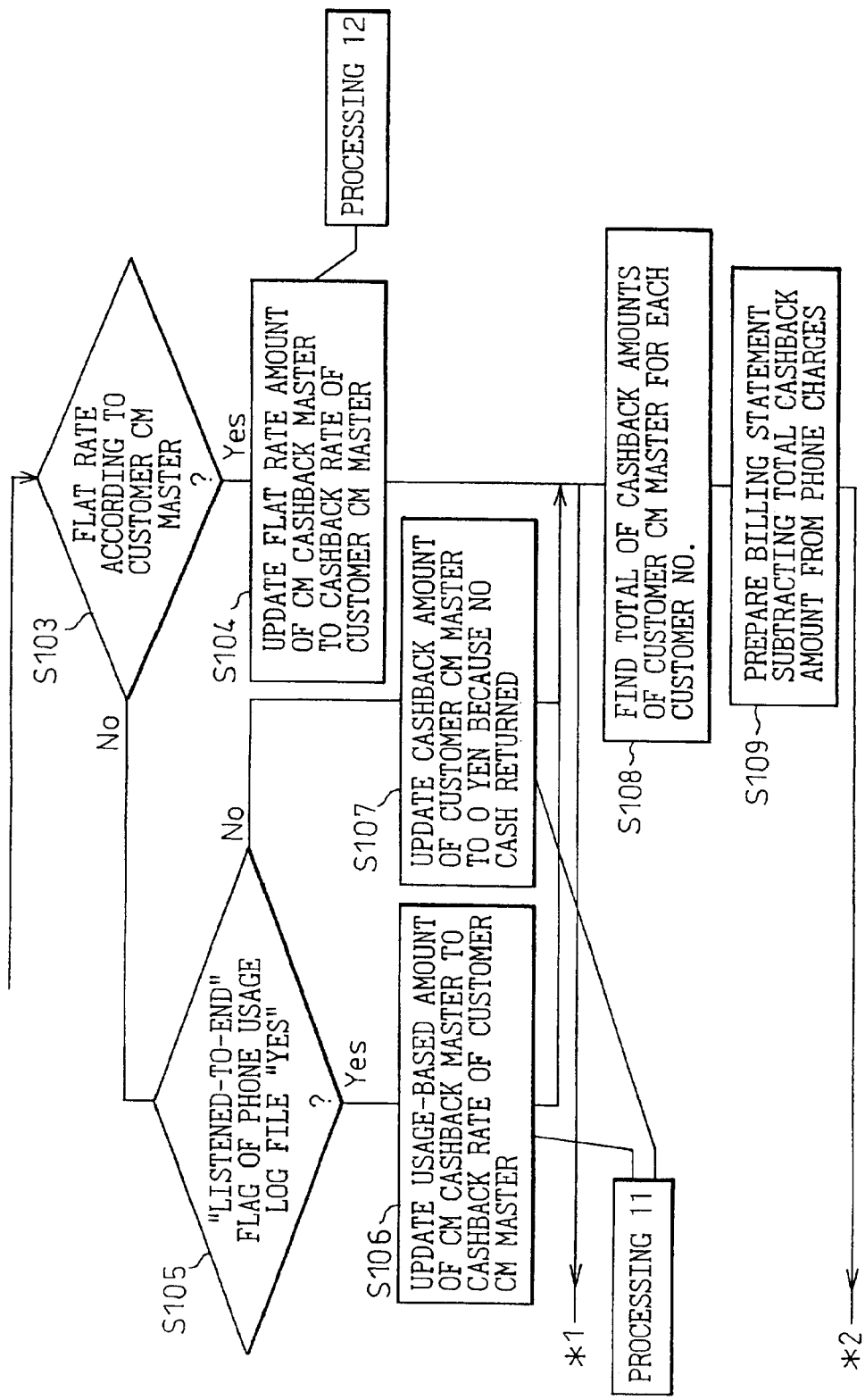

PROCESSING FOR BILLING CM AGENT COMPANIES

PROCESSING FOR BILLING CALLING CUSTOMERS

FIG. 8A

CM MASTER  21

| CM NO. | TYPE | CM NAME | CM CONTENT | NO. OF SEC. |
|---|---|---|---|---|
| 001 | ANSWERING SERVICE | "UNCLE TACCHI" | FJ "UNCLE TACCHI" SONG | 60 |
| 002 | RINGER | "UNCLE TACCHI 2" | "UNCLE TACCHI" SONG | 35 |
| · | · | · | · | · |
| 010 | ANSWERING SERVICE | SMAO | SMAO DEBUT SONG | 180 |

CM AGENT COMPANIES REGISTER ALL INFORMATION BY "PROCESSING 6"

TO ⓐ

| ANNOUNCEMENT MESSAGE | CM SWITCHING CODE | FILE NAME (WHEN SWITCHING CODE IS "1") | FILE NAME (WHEN SWITCHING CODE IS "2") | DEFAULT FILE |
|---|---|---|---|---|
| "HI THIS IS UNCLE TACCHI! WE'RE OUT NOW..." | "1": CHANGE ON MONDAY (CHANGE EVERY DAY) | C:¥¥XXXX¥YYY | C:¥XXXX¥YYY2 | · |
| "HELLO THIS IS UNCLE TACCHI! WE'RE OUT NOW..." | "2": CHANGE AT 24:00 (CHANGE EVERY HOUR) | C:¥¥XXXX¥ZZZ | C:¥¥XXXX¥ZZZ2 | · |
| · | · | · | · | · |
| NONE | "0": NO CHANGE | C:¥¥XXXX¥PPP | C:¥XXXX¥PPP2 | · |

FROM ⓐ

FIG.8B

CUSTOMER CM MASTER 22

| CUSTOMER NO. | CM NO. | RATE SYSTEM | CASHBACK AMOUNT |
|---|---|---|---|
| 090-1234-5678 | 001 | USAGE-BASED | 1000 |
| 03-1111-2222 | 010 | FLAT | 200 |

CUSTOMERS (CALLED PARTIES) REGISTER "CM NO." RATE SYSTEM (USAGE-BASED OR FLAT) FOR EACH "CUSTOMER NO." BY "PROCESSING 5"

UPDATE CASHBACK AMOUNTS BY FIGURES OF "PHONE USAGE LOG FILE" FOR EACH CUSTOMER BY "PROCESSINGS 11 AND 12"

FIG.8C

CM CASHBACK MASTER 23

| CM NO. | FLAT RATE/MONTH | USAGE-BASED RATE (AMOUNT PER CALL) | CALLER DISCOUNT RATE | CM AGENT NO. |
|---|---|---|---|---|
| 001 | 200 YEN | 50 YEN | 100% | 1 |
| 002 | 150 YEN | 30 YEN | 90% | 1 |
| 010 | 1000 YEN | 100 YEN | 80% | 2 |

CM AGENT COMPANIES REGISTER "FLAT RATES" AND "USAGE-BASED RATES" FOR RATES FOR EACH CM NO. BY "PROCESSING 8". THEY ALSO REGISTER "DISCOUNT RATES" FOR CASHBACK OF CALLER SIDE.

FIG.8D

CM AGENT MASTER 24

| CM AGENT NO. | CM AGENT | NAME OF PRESIDENT | ADDRESS | NAME OF BANK | BANK ACCOUNT NO. |
|---|---|---|---|---|---|
| 1 | FJCM COMPANY | TARO FUJITSU | SHIBUYA-KU,TOKYO | FUJITSU BANK | 1111 |
| 2 | AAA COMPANY | HANAKO FUJITSU | OSAKA... | FUJITSU BANK | 2222 |
|  |  |  |  |  |  |

CM AGENT COMPANIES REGISTER ALL INFORMATION OF ITEMS BY "PROCESSING 7"

FIG.8E

PHONE USAGE LOG FILE 25

| CUSTOMER NO. | OTHER PARTY PHONE NO. | CM NO. | "LISTENED-TO-END" FLAG | STARTING TIME | ENDING TIME |
|---|---|---|---|---|---|
| 090-1234-5678 | 03-1234-5678 | 001 | YES (LISTENED TO END) | 10:15:00 | 10:17:00 |
| 090-1234-5678 | 03-1234-5678 | 001 | NO (HUNG UP IN MIDDLE) | 10:17:00 | 10:25:00 |
| 090-1234-5678 | 03-9876-5432 | 010 | NO (HUNG UP IN MIDDLE) | 14:00:00 | 14:00:10 |
| | | | | | |

UPDATE USAGE LOG "CUSTOMER NO.", "OTHER PARTY PHONE NO.", AND "STARTING TIME" BY "PROCESSINGS 1 AND 3". FURTHER, OBTAIN AND UPDATE "CM NO." IN ACCORDANCE WITH RINGER OR ANSWERING SERVICE USE BY CUSTOMER CM MASTER AND CM MASTER.

UPDATE "LISTENED-TO-END FLAG" AND "ENDING TIME" BY "PROCESSINGS 2 AND 4"

FIG.8F

CALLER LOG FILE 26

| CUSTOMER NO. | CASHBACK |
|---|---|
| 03-1234-5678 | 100 YEN |
| 090-9876-5432 | 500 YEN |
|  |  |

UPDATE CASHBACK AMOUNT BY EXACTLY MINUTES OF LISTENING BY CALLER (=OTHER PARTY PHONE NO.) FROM PHONE USAGE LOG FILE BY "PROCESSINGS 9 AND 10"

TELEPHONE SERVICE METHOD AND TELEPHONE SERVICE APPARATUS

BACKGROUND OF THE INVENTION

1. Field of the Invention

The present invention relates to a telephone service method, telephone service apparatus and telephone service program for providing a certain service when receiving a telephone call.

2. Description of the Related Art

In the past, when dialing another party by a telephone to call a mobile phone or regular phone of that party, the other party sometimes will not answer the phone for some reason or another. In such a case, one has continue ringing until the other party answers the phone or ends up being switched to an answering service function, listens to the message, and then records one's own message after the beep.

In the case of an audible ringing signal, the audible ringing signal remains the same at all times. In the case of an answering service function, the message indicating that the answering service function has begun, for example, "I can't come to the phone now . . . ", runs, a beep is given, and then recording is begun.

In the above way, in a conventional telephone, one could only hear the same audible ringing signal continuously when calling up another party. The caller therefore wasted his or her time.

Alternatively, after continuously ringing for a certain time, the answering service function kicked in and a message indicating that the function started ran. Therefore the caller had to listen to the same fixed information again and again.

SUMMARY OF THE INVENTION

An object of the present invention is to provide a telephone service method and apparatus which refer to a table when a phone call is made and when the number called is registered, send another message in place of the audible ringing signal or answering service announcement message, and return cash to the called user or the calling user.

To attain the above object, the telephone service method of the present invention comprises the steps of receiving a request for line connection from a phone of a caller, determining an identifier of a phone of a called party for which line connection is requested, judging whether the identifier of the called party is registered in a management table linking called party identifiers and business advertisements, and, when judging that the identifier of the called party is registered, sending a business advertisement linked with that identifier from business advertisements stored in a content database to the phone of the caller.

BRIEF DESCRIPTION OF THE DRAWINGS

These and other objects and features of the present invention will become clearer from the following description of the preferred embodiments given with reference to the attached drawings, wherein:

FIG. 1 is a view of the overall layout of FIGS. 1A and 1B;

FIGS. 1A and 1B are views of the system configuration of the present invention;

FIG. 2 is a view of the overall layout of FIGS. 2A to 2D;

FIGS. 2A, 2B, 2C, and 2D are flow charts of call receiving processing in the present invention;

FIG. 3 is a view of the overall layout of FIGS. 3A to 3D;

FIGS. 3A, 3B, 3C, and 3D are flow charts of answering service announcement processing in the present invention;

FIG. 4 is a view of the overall layout of FIGS. 4A to 4D;

FIGS. 4A, 4B, 4C, and 4D are flow charts of content selection registration processing of a called user of the present invention;

FIG. 5 is a view of the overall layout of FIGS. 5A and 5B;

FIG. 6 is a view of the overall layout of FIGS. 6A and 6B;

FIGS. 6A and 6B are flow charts of cashback processing for a calling user of the present invention;

FIG. 7 is a view of the overall layout of FIGS. 7A to 7D;

FIGS. 7A, 7B, 7C, and 7D are flow charts of billing processing of the present invention; and FIGS. 8A, 8B, 8C, 8D, 8E, and 8F are views of examples of masters and files of the present invention.

DESCRIPTION OF THE PREFERRED EMBODIMENTS

Preferred embodiments of the present invention will be described in detail below while referring to the attached figures.

Figure 1B:
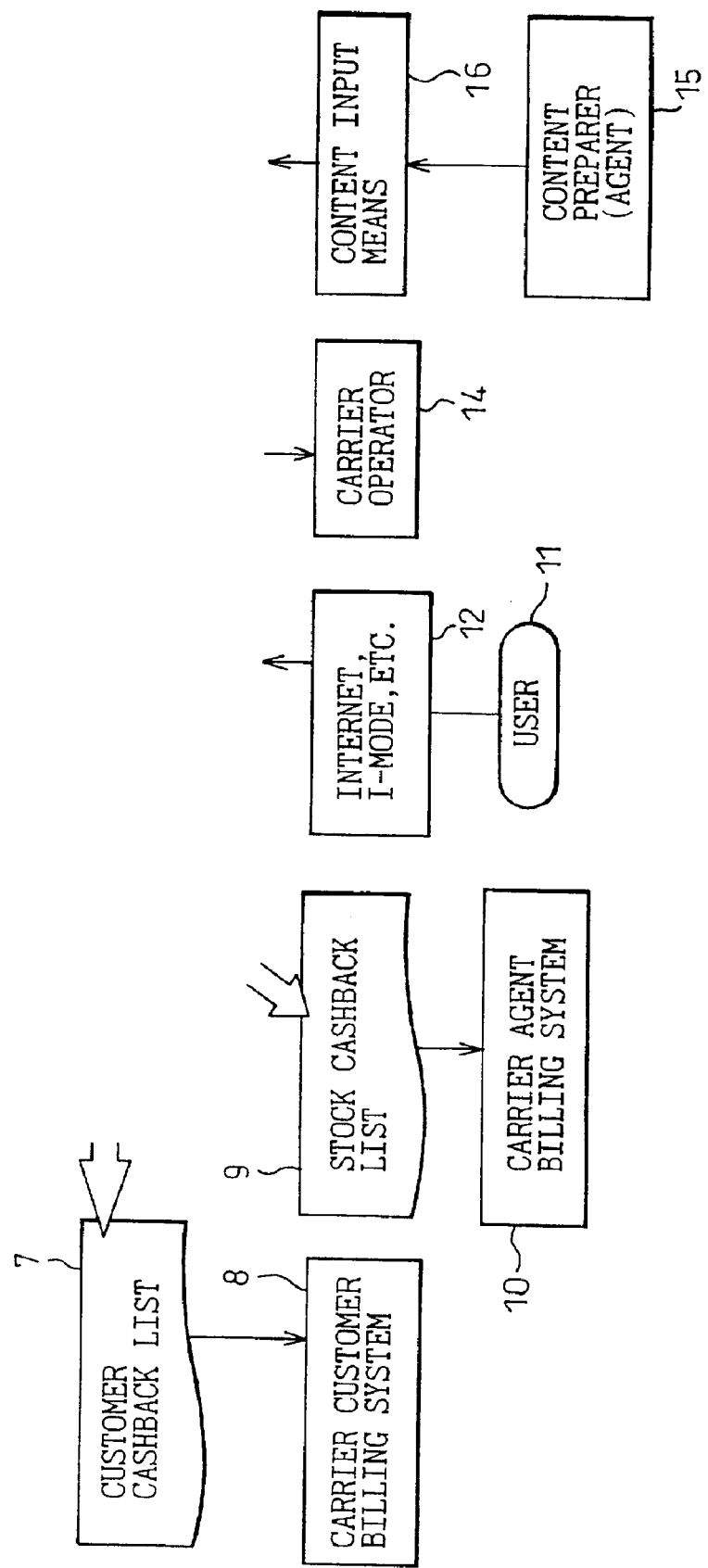

The means for achieving the object of the present invention will be explained first with reference to FIGS. 1A and 1B. In FIGS. 1A and 1B, the telephone 1 is a telephone (including mobile phones) which a user uses to make a call.

A processing apparatus 2 performs various processing in accordance with a set program. Here, it is comprised of a call sending and receiving means 3 and a customer master 22. The call sending and receiving means 3 sends and receives calls or sends messages. The customer master 22 is registered with telephone numbers of called parties.

Next, the operation will be explained. When receiving a call from a phone 1 of a caller, the call sending and receiving means 3 of the processing apparatus 2 refers to the customer master (table) 22. When the number of the called party is registered, it sends a message out in place of an audible ringing signal or answering service announcement. It also stores the number of the called party etc. as a log when sending out a message.

That is, when receiving a phone call, it judges whether the number of the called party is registered in the customer master 22, sends out a message when judging that it is registered, and stores the number of the called party as a log when sending out that message.

The number of the caller is stored as a log only when the sending time of the message exceeds a predetermined length. Further, the message sent is switched to another message according to the season, date and time, day of the week, etc. set in the table (master) linked with the messages.

Cash is returned to the called parties and callers based on phone numbers stored in the log.

Next, an embodiment of the present invention and its operation will be successively explained using the attached drawings.

FIG. 1 is a view of the overall layout of FIGS. 1A and 1B. FIGS. 1A and 1B are views of the system configuration of the present invention.

In FIGS. 1A and 1B, the telephone 1 is a phone by which a user places a call (including mobile phones), that is, a phone (terminal) for the transfer of a voice signal or data by wired or wireless connection.

The processing apparatus 2 performs various processing in accordance with a set program. Here, it is comprised of a call sending and receiving means 3, an announcement message broadcasting means 4, an answering service recording means 5, a billing means 6, a customer information and stock information linking means 13, a CM stock registering and cashback amount registering means 17, a customer master 22, a phone usage log file 25, announcement content 27, etc.

The call sending and receiving means 3 sends and receives audio data of calls of a caller and a called party, sends normal audible ringing signals or answering service announcements or messages in place of the same etc. (explained later using FIGS. 2A to 2D to FIGS. 8A to 8F).

The message broadcasting means 4 sends the usual message of an answering service function or, when the conditions match, a message in place of the same.

The answering service recording means 5 records content as in a usual answering service function.

The billing means 6 calculates the cash to be returned to the customers of the calling or called phone numbers based on the phone usage log file 25, customer master 22, etc. and prepares bills including the cashback amounts. Here, it prepares a customer cashback list 7, a stock cashback list 9, etc. Further, it performs processing for billing the expenses for the cashback service to the content preparers (agents).

The customer cashback list 7 is a list of the amounts of cash to be returned to the calling and called customers when messages are sent. A customer billing system 8 of the carrier subtracts the amounts of cash from the amounts billed to the customers of that carrier (carrier providing the communications network to the customers) based on the customer cashback list and prepares bills for the remaining amounts.

The stock cashback list 9 is a list of the amounts of cash to be returned for each message (stock) sent to customers. An agent billing system 10 of the carrier prepares bills for the transmission of stock (messages) based on the stock cashback list 9.

A user 11 uses the Internet or i-mode 12 to register membership information or a selected message (register as customer in customer CM master 22).

The customer information and stock information linking means 13 links the customer information and stock (messages to be sent) (see FIG. 8B).

An operator 14 of the carrier registers customers who apply to receive the cashback service for listening to messages on the phone in the customer CM master 22.

The content preparer (agent) 15 prepares content (messages or commercials etc. to be sent).

A content input means 16 inputs the content, cashback conditions, etc. through the Internet.

The CM stock registering and cashback registering means 17 registers the content input from the content input means 16 and the amounts of cash to be returned by linking with each other.

A cashback means 20 calculates the amounts of cash to be returned in accordance with the amounts of messages which customers of telephone numbers placing calls listen to.

The customer master 22 is registered with (updates) the CM numbers, rate systems, cashback amounts, etc. linked with the customers (see later explained FIG. 8B).

The phone usage log file 25 stores logs of usage of phones sent content in place of ordinary audible ringing signals or announcement messages (see later explained FIG. 8E)

The announcement content 27 is a content database formed by registration of prepared content taking the place of ordinary audible ringing signals or answering service announcements.

A telephone 31 is the phone of the called party to which a call is placed by the telephone 1. Illustration of the network between the telephone 1 and the processing apparatus 2, the network between the processing apparatus 2 and the telephone 31, the exchange, etc. is omitted.

Next, the operation when a user uses the telephone 1 to dial a number and place a call through the processing apparatus 2, under the configuration of FIGS. 1A and 1B, will be explained in detail in accordance with the flow charts of FIGS. 2A to 2D.

Figure 2B:
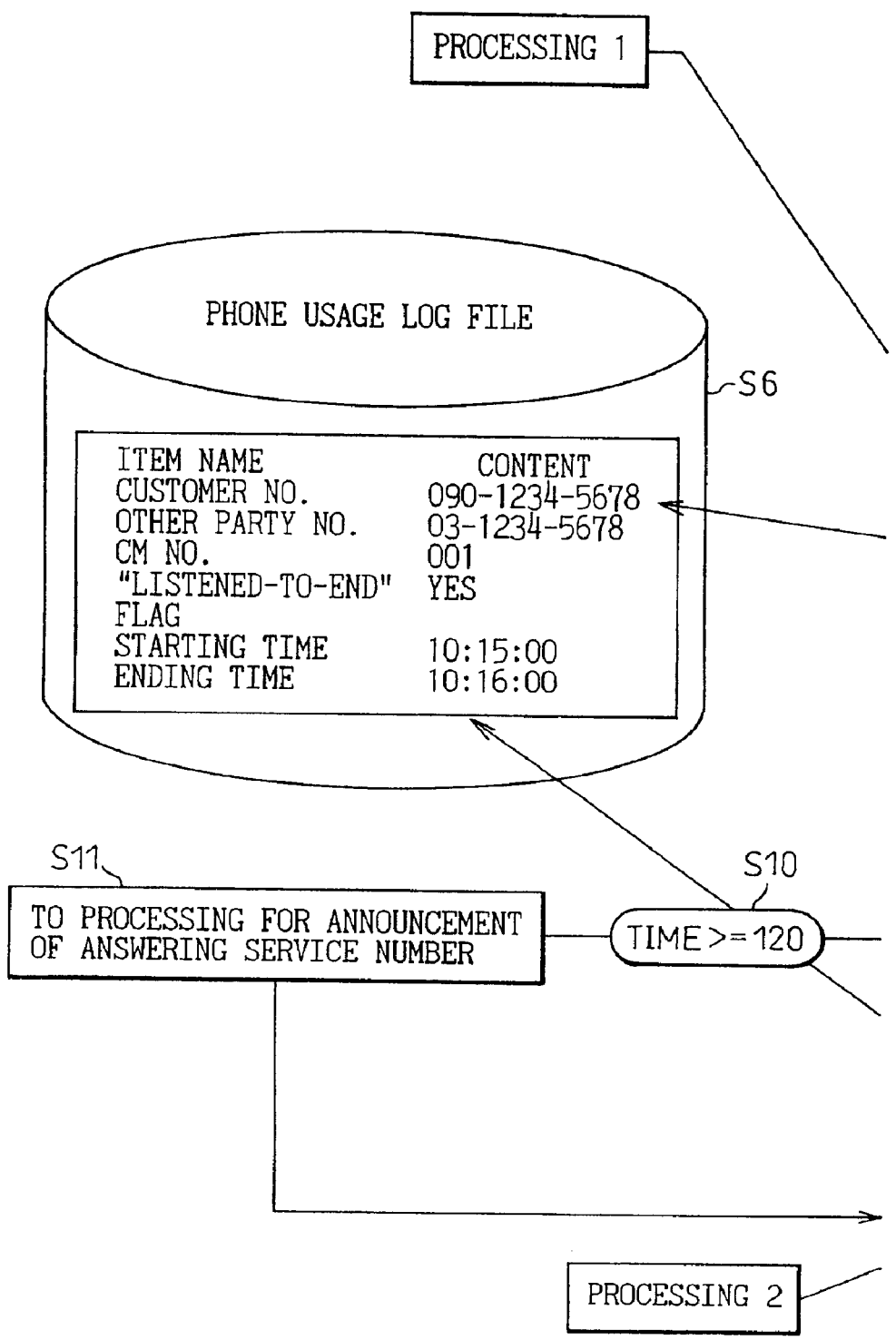
Figure 2D:
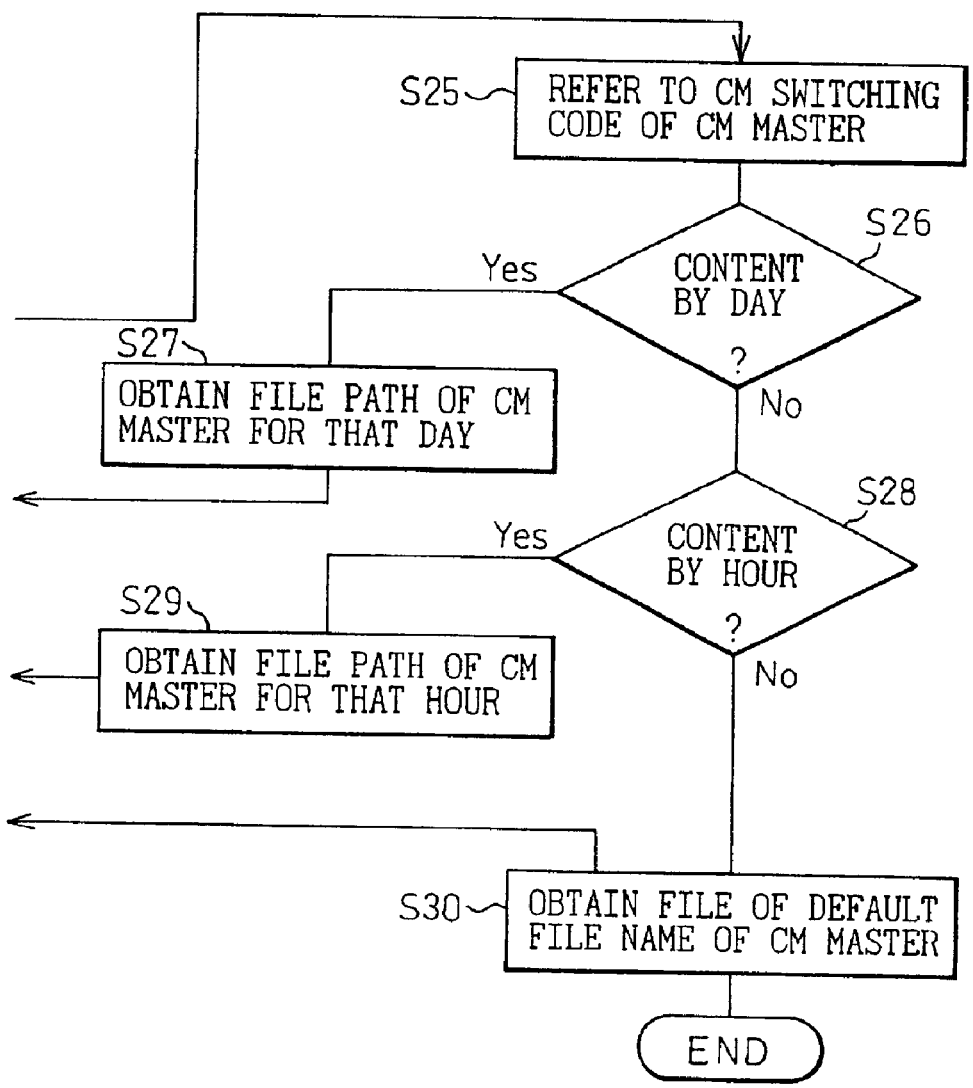

FIG. 2 is a view of the overall layout of FIGS. 2A to 2D. FIGS. 2A to 2D are flow charts of the call receiving processing of the present invention. FIGS. 2A and 2B are overall flow charts.

In FIGS. 2A and 2B, at step S1, a user places a call. This is done by the calling user of FIG. 1A dialing the phone 1 to place a call which is then routed through the processing apparatus 2 (that is, picking up the receiver and dialing the phone number).

At step S2, a not shown called phone position judging means judges if the called phone is out of the service area. That is, it judges if it is out of the service area when receiving the call of step S1 and calling up the telephone of that number (in a mobile phone, when it is not in an area reached by the radio waves or when the power is turned off). When YES, that is, the phone is judged to be out of the service area, the routine proceeds to step S11, from which the routine proceeds to the answering service number announcement processing (answering service announcement processing of FIGS. 3A to 3D), where the routine ends. On the other hand, when NO at step S2, that is, the phone is judged to be in the service area, the routine proceeds to step S3.

At step S3, the called number is searched for from the telephone numbers registered in the customer CM master 22.

At step S4, it is judged if the customer number (called telephone number) is registered in the customer CM master 22. When YES, that is, it is judged that the customer number is registered, the routine proceeds to step S5. When NO, that is, it is judged that the customer number is not registered and therefore the called customer has not registered that it wishes to obtain cash back in return for running a message (content), the routine proceeds to step S12, where an ordinary audible ringing signal is sent to the calling phone 1. The routine then ends.

At step S5, a new phone usage log file 25 is prepared. This stores the phone number of the called party, the phone number of the caller, the CM No. of the customer CM master, and the starting date.

At step S6, the registered message of the customer is read and broadcast. That is, the apparatus reads the registered message (content, commercial, etc.) of the CM number registered linked in the customer master 22 of FIG. 8B and broadcasts (sends) it to the phone 1 of the calling customer instead of the usual audible ringing signal to play it to the calling customer.

At step S7, it is judged if the called party picks up the phone 31. That is, it is judged if the called party answers the phone. When YES, that is, the called party answers the phone 31, the routine proceeds to step S9, where it is judged if the message sent was run to the end. Based on the results of judgement, the "listened-to-end" flag and ending time in the phone usage log file 25 are updated (set) and the routine ended. On the other hand, when NO, that is, when the called party does not answer the phone, the routine proceeds to step S8.

At step S8, the time is monitored. For example, the time is monitored for up to 120 seconds. If below 120 seconds, the routine returns to the judgement of step S7, while when over 120 seconds, it proceeds to step S11.

At step S10, the time is monitored. When over 120 seconds, it proceeds to step S11.

At step S11, the routine proceeds to the answering service number announcement processing of FIGS. 3A to 3D.

FIG. 2C shows an example of the detailed processing for reading and broadcasting (sending) the message of step S6 in FIG. 2A.

In FIG. 2C, at step S21, the CM master 21 is searched through using the CM number in the customer CM master 22. This is done by extracting the CM number (commercial number, for example, "001") registered linked with the phone number of the caller (customer number) from the customer CM master 22 of FIG. 8B and searching for the record of the CM number ("001") from the CM master 21 of FIG. 8A.

At step S22, the content file is selected based on the CM switching code. This is done by switching and selecting among a plurality of recorded content files (selecting a content file corresponding to the CM switching code) based on the CM switching code (for example, "1" meaning change every Monday) of the record of the CM number (for example, "001") in the CM master 21 of FIG. 8A.

Step S25 to step S30 of FIG. 2D show the detailed processing of step S22 of FIG. 2C.

At step S25, the CM switching code in the CM master 21 for the CM number is referred to.

At step S26, it is judged if the content is determined by day. This is done by judging if the CM switching code referred to at step S25 calls for changing the content by day. When YES, the routine proceeds to step S27, where the file path in the CM master 21 for that day is obtained, then the routine proceeds to step S23. On the other hand, when NO at step S26, the routine proceeds to step S28.

At step S28, it is judged if the content is determined by hour. This is done by judging if the CM switching code referred to at step S25 calls for changing the content by hour. When YES, the routine proceeds to step S29, where the file path in the CM master 21 for that hour is obtained, then the routine proceeds to step S23. On the other hand, when NO at step S28, the routine proceeds to step S30, where the file path of the default file name in the CM master 21 is obtained, then the routine proceeds to step S23.

At step S23, the content file of the file path designated at step S27, step S29, or step S30 is loaded.

At step S24, the hard disk storage device is accessed and the content of the file is reproduced (sent toward the telephone 1 of the customer). Next, the content is played to the calling customer.

Figure 3A:
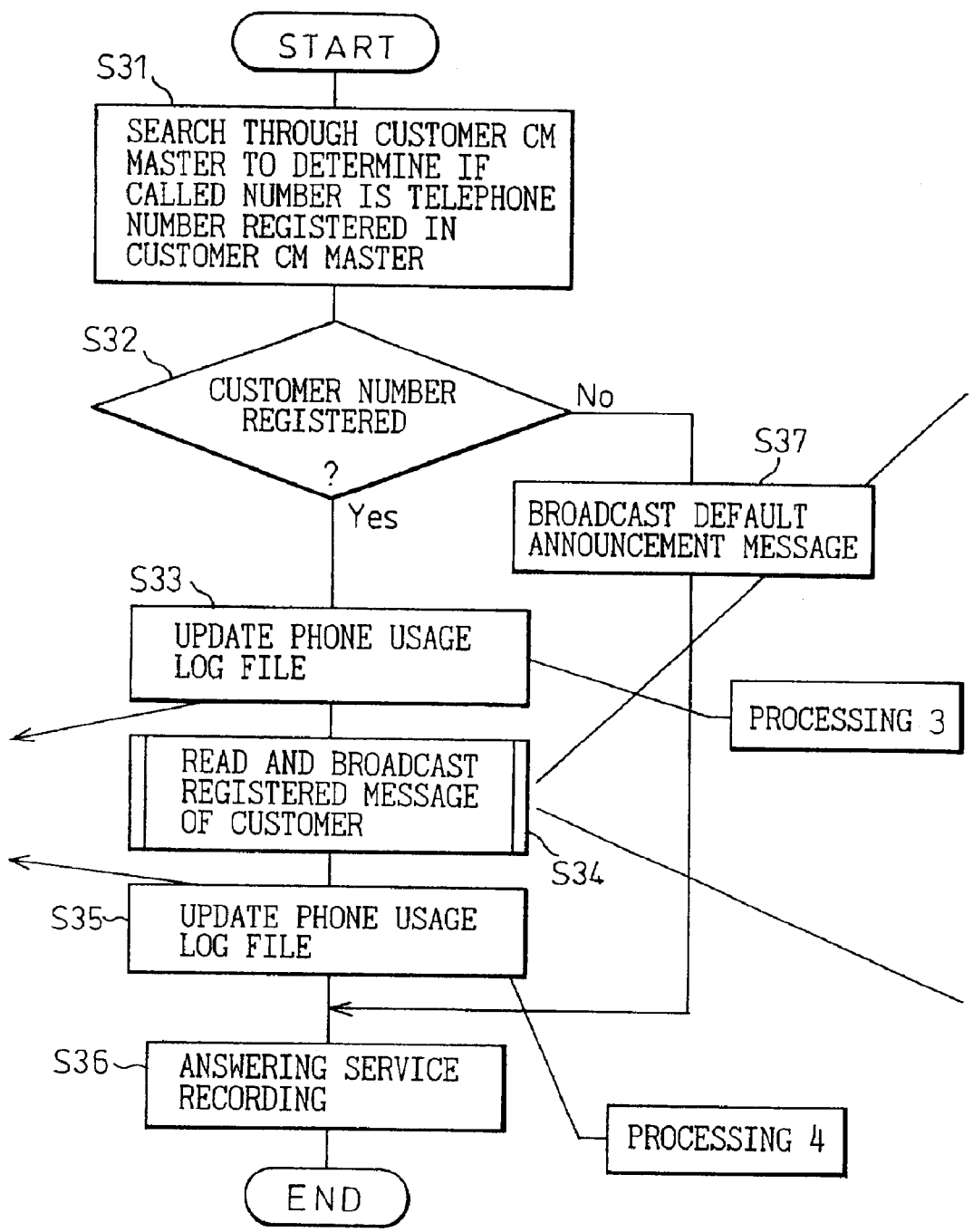
Figure 3B:
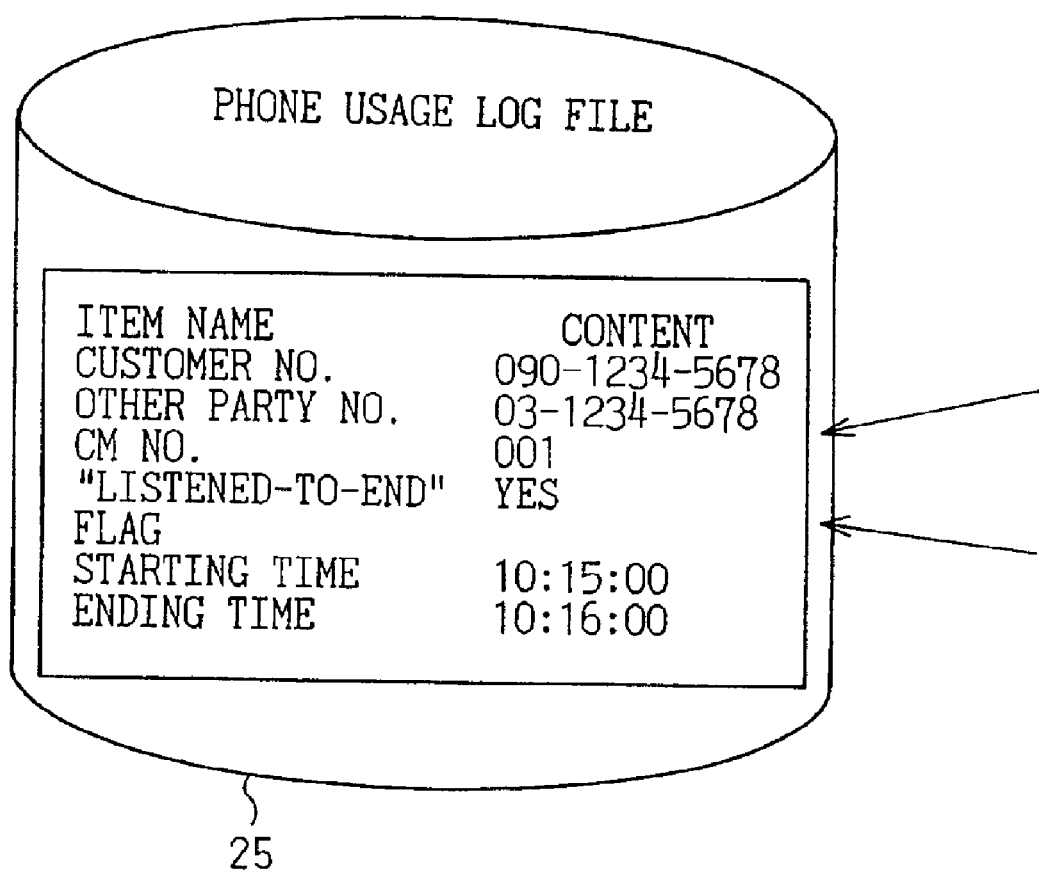
Figure 3D:
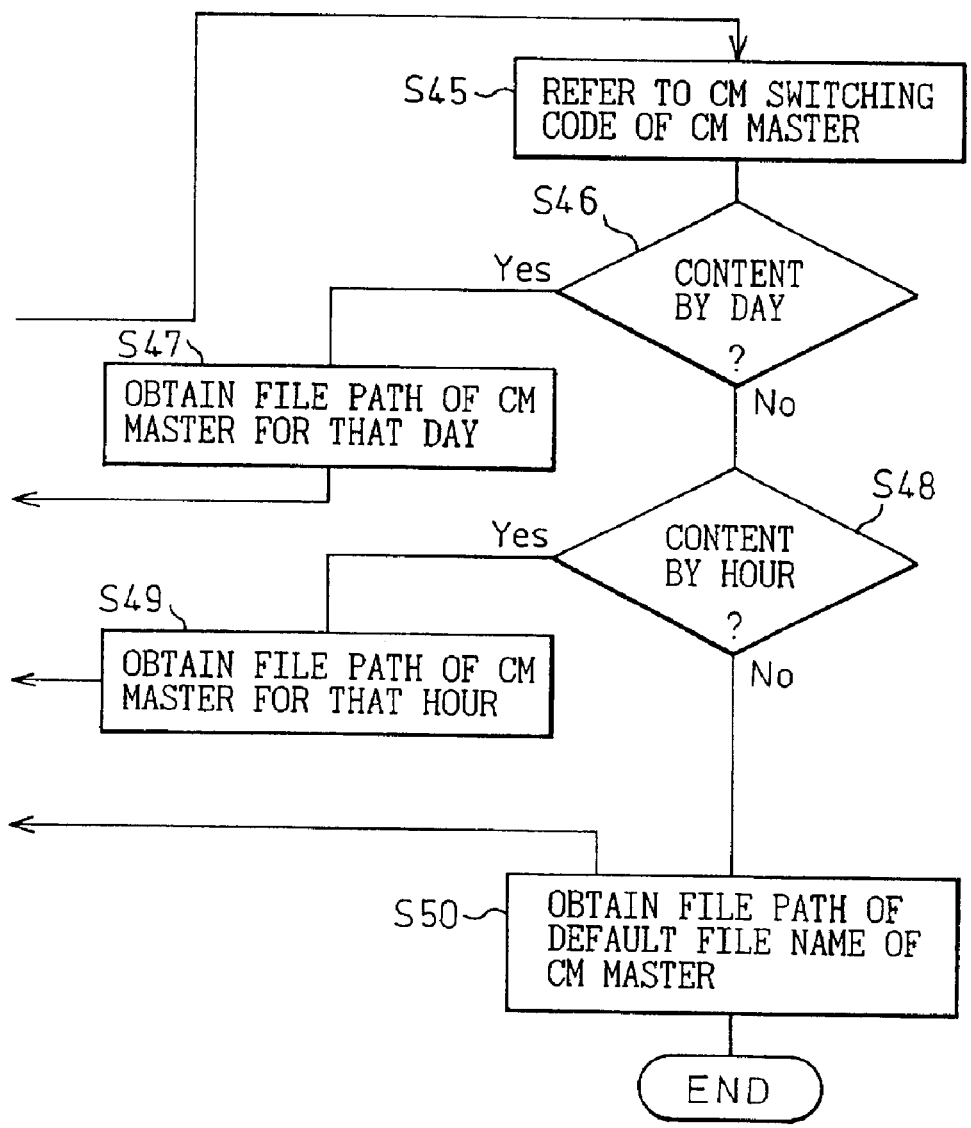

FIG. 3 is a view of the overall layout of FIGS. 3A to 3D. FIGS. 3A to 3D are flow charts of the answering service announcement processing of the present invention. FIGS. 3A and 3B are overall flow charts.

In FIGS. 3A and 3B, at step S31, the called telephone number is searched for from the telephone numbers registered in the customer CM master 22.

At step S32, it is judged if the customer number is registered. If YES, that is, it is judged that the customer number is registered, the routine proceeds to step S33. If NO at step S32, that is, it is learned that the customer number is not registered and therefore the called customer has not registered that it wishes cash back in return for transmitting a message (content), the routine proceeds to step S37, where the default normal message is broadcast, then the routine proceeds to step S36, where the answering service recording function is activated and the routine ends.

At step S33, it is learned that the called customer has registered that it wishes cash back in return for transmitting a message (content), so a new phone usage log file 25 is recorded with the "customer number" and "CM number" obtained by referring to the customer CM master 22 and is recorded with the telephone number of the caller, that is, the "other party number", and the starting time for reproducing the message. Logs of these are stored.

At step S34, the registered message of the called customer is read and reproduced. This is done by reading the registered message (content, commercial, etc.) of the CM number registered linked with the CM customer master 22 of FIG. 8B, broadcasting (sending) it toward the phone 1 of the calling customer, and playing it to the calling customer. At step S35, the "listened-to-end" flag in the phone usage log file 25 is updated (set) to YES (listened to end), then the routine proceeds to step S36, where the routine proceeds to the answering service recording function and the routine ends. Further, while not shown, when the calling customer hangs up the phone during the answering service announcement message, the "listened-to-end" flag is updated to NO (hung up in the middle) and the routine is ended as it is.

FIG. 3C shows an example of the detailed processing for reading and broadcasting (sending) a message of step S34 in FIGS. 3A and 3B. Here, step S41 to step S50 of FIGS. 3C and 3D correspond to step S21 to step S30 of FIGS. 2C and 2D, so explanations thereof will be omitted.

By the above step S41 to step S50, the calling customer dials the phone 1, the called party answers the phone, then a predetermined file is loaded in accordance with a switching code based on the customer CM master 22 of FIG. 8B and the CM master 21 of FIG. 8A, then the content is converted to audio and sent toward the phone 1 of the customer. At this time, by setting the switching code (setting it to change the content for each day, for each hour, for each season, etc.), it is possible to switch the content sent to the phone 1 of the calling customer to the optimal content at any time.

Figure 4D:
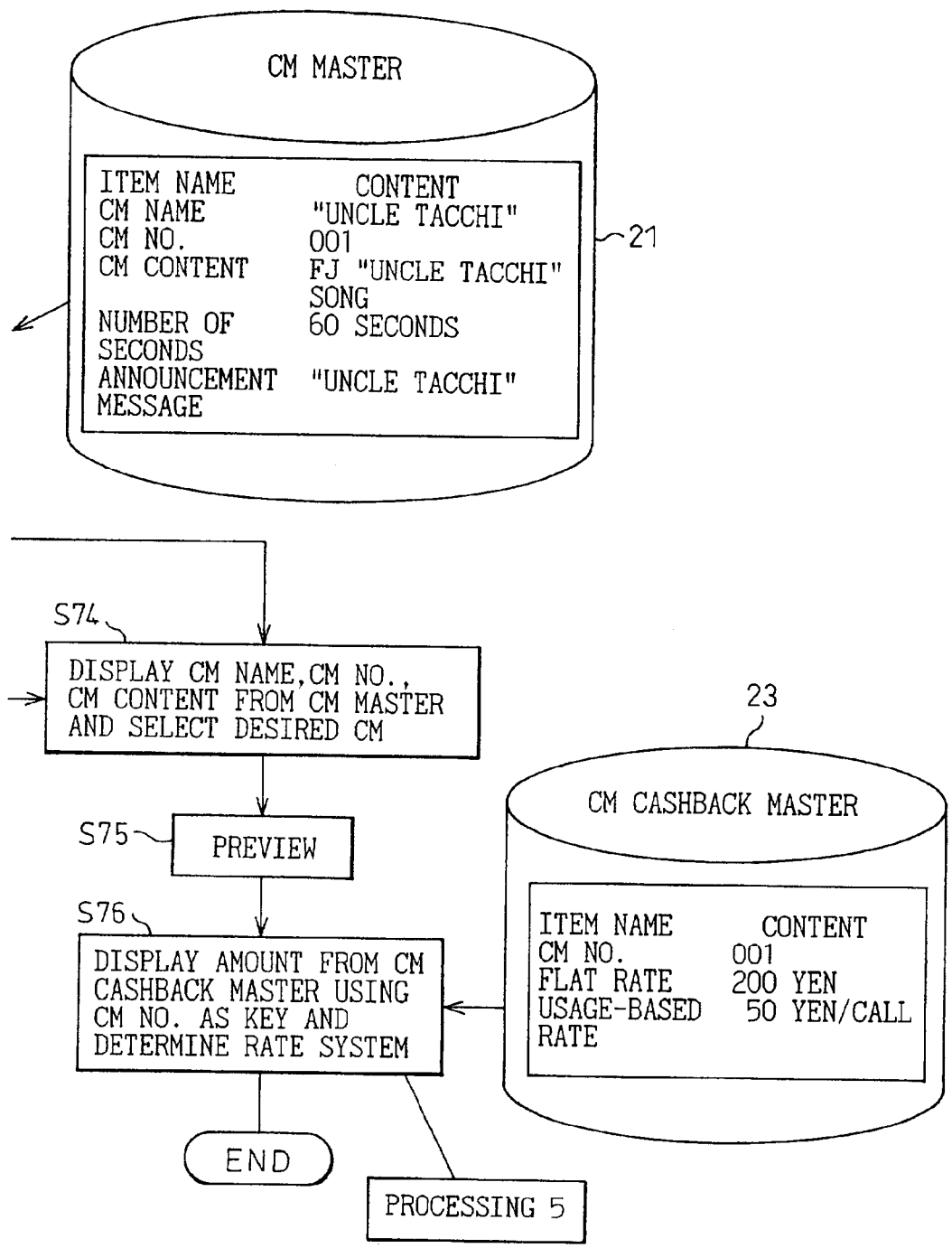

FIG. 4 is a view of the overall layout of FIGS. 4A to 4D. FIGS. 4A to 4D are flow charts of the processing for selection and registration of a message set in advance by a called customer according to the present invention.

FIGS. 4A and 4B show an example of an operator of a service center handling processing for registration for a customer by phone.

In FIGS. 4A and 4B, at step S51, the operator answers a call from a customer.

At step S52, it confirms (authenticates) the customer.

At step S53, it compares the registered telephone number with the customer number to obtain the CM number.

At step S54, it explains and previews the CM information (explained in detail at step S71 to step S76 of FIGS. 4C and 4D).

At step S55, it judges if the CM has been decided on. When YES, the routine proceeds to step S56, where the operator performs processing linking the customer and the CM, then the routine ends.

Due to the above, it becomes possible to perform processing for linking the customer information and the stock information (CM's and contents).

FIG. 4B shows an example of input by a customer by the Web or i-mode.

In FIG. 4B, at step S61, customer authentication processing (ID, password) is performed. Next, the routine proceeds to step S52, where processing similar to the above is performed.

FIGS. 4C and 4D show an example of processing for explaining and previewing CM information.

In FIGS. 4C and 4D, at step S71, the CM master 21 is searched through by the CM number in the customer CM master 22. For example, the CM master 21 is searched through as shown in FIG. 4D. When the result at step S71 is "EXISTS", the routine proceeds to step S72, while when the result is "NOT EXIST", the routine proceeds to step S74.

At step S72, since it is learned by the "EXISTS" at step S71 that the CM exists in the CM master 21 of FIG. 8A, it is then judged whether to change the CM/rate. When YES, the routine proceeds to step S74, while when NO, the CM is previewed at step S73 and the routine ended.

At step S74, the CM name, CM number, and CM content are displayed from the CM master 21 and the desired CM is selected. In this case, when an operator receives this by a phone call, the operator verbally explains the information regarding the CM to the customer to persuade the customer to select it.

At step S75, the customer previews the CM.

At step S76, the amount is shown from the cashback master 23 using the CM number as a key and the rate system is determined. For example, as shown by the cashback master 23 described in FIG. 4D, either a flat rate or usage-based rate system is determined.

Figure 5A:
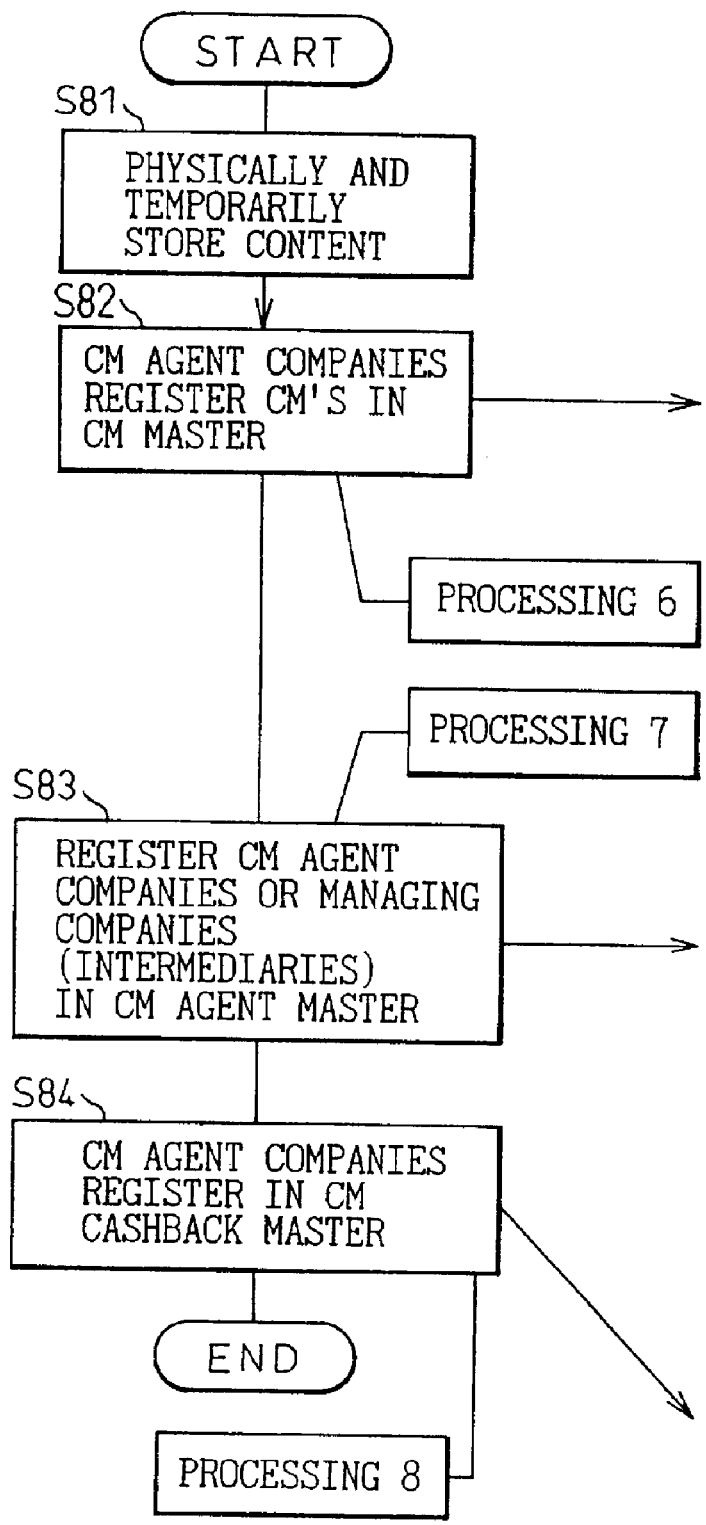
FIGS. 5A and 5B are flow charts of content registration processing by a content preparer (agent) of the present invention.
Figure 5B:
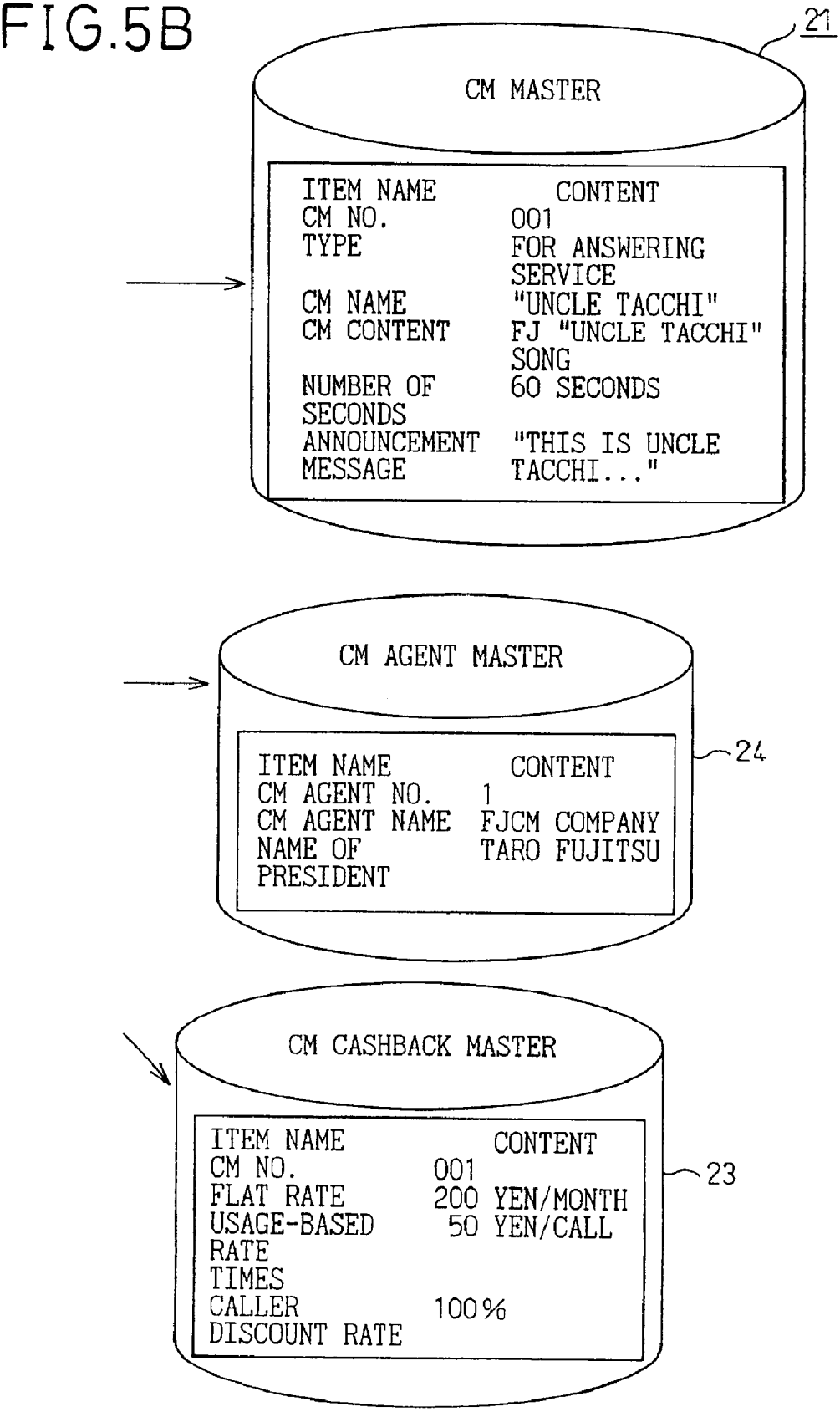

FIG. 5 is a view of the overall layout of FIGS. 5A and 5B.

FIGS. 5A and 5B are flow charts of the processing for a content preparer (agent) of the present invention to register various conditions relating to the content stock and cashback service.

In FIG. 5A, at step S81, the preparer performs processing for physically and temporarily storing the content. For example, it copies data by file transfer technology on the Internet or on a CD-ROM, MO, FDD, tape, or other medium.

At step S82, the CM agent company registers the information relating to a CM in the CM master 21. For example, it registers it as shown in the CM master 21 shown in FIG. 5B.

At step S83, the CM agent company or managing company (intermediary) register its information in the CM agent master 24. For example, it registers this in the CM agent master 24 shown in FIG. 5B.

At step S84, the CM agent company registers information in the CM cashback master 23. For example, it registers this in the CM cashback master 23 shown in FIG. 5B.

Due to the above, it becomes possible to perform processing for registration of the CM stock and the cashback amount.

Figure 6B:
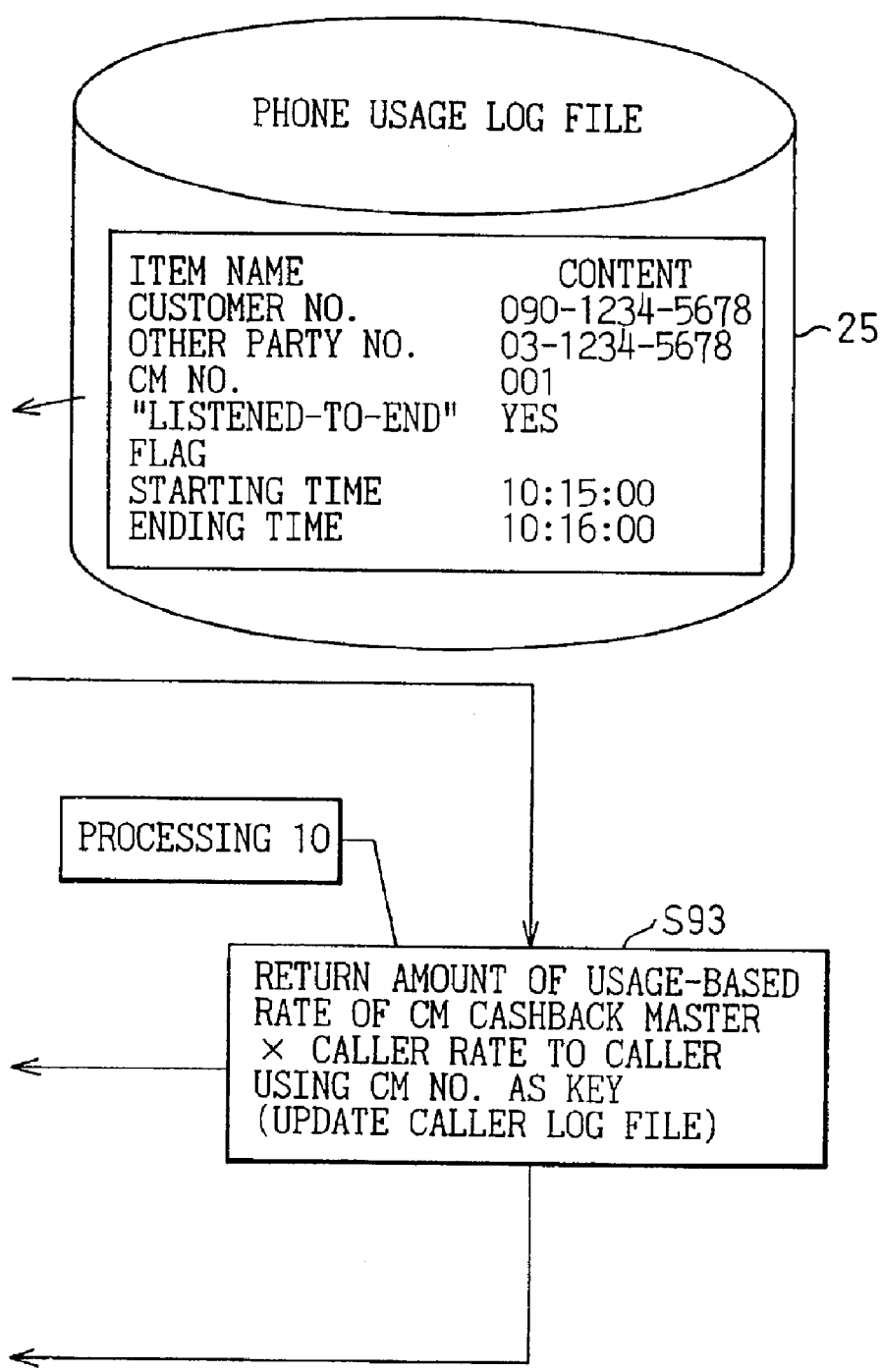

FIG. 6 is a view of the overall layout of FIGS. 6A and 6B. FIGS. 6A and 6B are flow charts of the processing when cash is returned to the calling customer of the present invention.

In FIG. 6A, at step S91, it is judged if the "listened-to-end" flag is YES using as a key the other party number in the phone usage log file 25. When YES, that is, it is learned that the CM was listened to up to the end, the routine proceeds to step 92, where the amount of the usage-based rate in the CM cashback master 23 is returned to the caller using the CM number as a key (that amount is added to the cashback amount to update it as shown in the caller log file 26 of FIG. 6A). On the other hand, when NO at step S91, it is learned that the phone was hung up in the middle of the CM, so at step S93 (FIG. 6B), the amount of the usage-based rate in the CM cashback master 23×caller rate is returned to the caller using the CM number as a key (similarly updated as in the caller log file 26 of FIG. 6A). When the CM number is "001" (FIG. 8C), reference to the CM cashback master 23 shows that the caller discount rate is "100%", so the amount becomes 50 yen regardless of whether the entire CM was listened to or not.

Figure 7C:
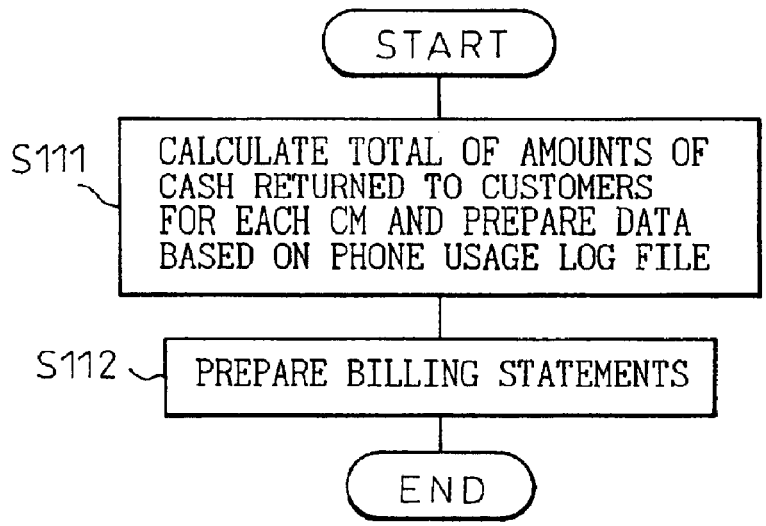
Figure 7D:
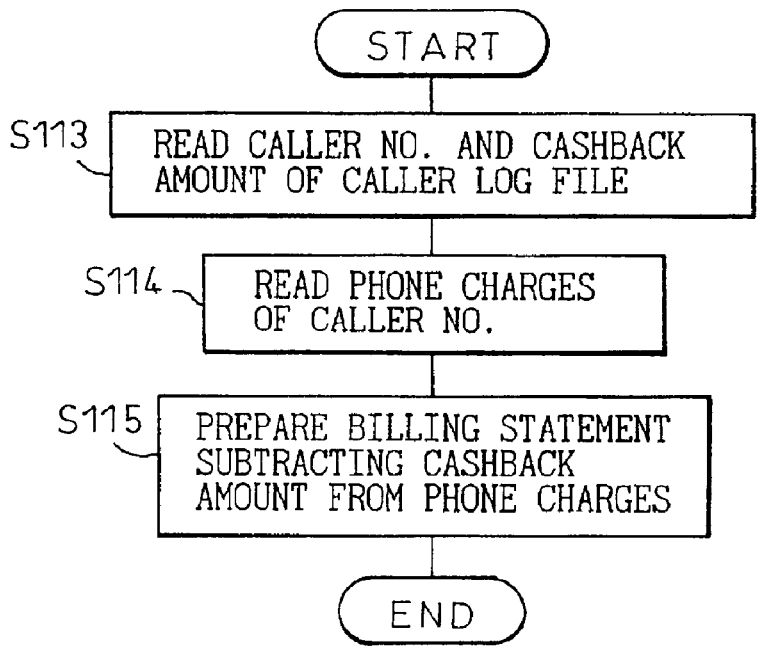

FIG. 7 is a view of the overall layout of FIGS. 7A to 7D. FIGS. 7A to 7D are flow charts of the billing processing of the present invention.

FIGS. 7A and 7B show an example of processing for billing a customer.

In FIGS. 7A and 7B, at step S101, preparation of statement data including the discount to the customer starts based on the phone usage log file 25 and the customer CM master 22.

At step S102, it is judged if the phone usage log file 25 includes the customer number registered in the customer Cm master 22. When YES, the routine proceeds to step S103. When NO, the routine ends and processing for billing normal charges is performed.

At step S103 (FIG. 7B), it is determined if the rate is a flat one from the customer CM master 22. That is, it is determined if the rate system of the entry concerned is a flat rate from the customer CM master 22 of FIG. 7A. When YES, the routine proceeds to step S104, where the flat rate in the CM cashback master 23 is made the cashback amount in the customer CM master 22, then the routine proceeds to step S108. On the other hand, when NO at step S103, a usage-based system is used for the cashback service, so the routine proceeds to step S105 (FIG. 7B).

At step S105 (FIG. 7B), it is determined if the "listened-to-end" flag in the phone usage log file 25 containing that customer number is YES (listened to the end). When YES, the routine proceeds to step S106, where the usage-based rate in the CM cashback master 23 is added to the cashback amount in the customer CM master 22, then the routine proceeds to step S108. When NO at step S105, that is, it is learned that the "listened-to-end" flag is NO and the phone was hung up in the middle of the CM, the routine proceeds to step S107, where no cash is returned. Therefore, nothing is added to the cashback amount in the customer CM master 22 and the routine proceeds to step S108. When there is another phone usage log file 25 containing that customer number, the routine returns to step S102, where the processing is repeated.

At step S108, the total of the cashback amount in the customer CM master 22 is found for each customer No.

At step S109, the bill is prepared by subtracting the total cashback amount from the phone charges.

FIGS. 8A to 8F show examples of masters and files of the present invention. The "processing 1" to "processing 12" shown in the figures are processings registered or updated in the "processing 1" to "processing 12" shown in anyone of FIGS. 2A to 2D to FIGS. 7A to 7D.

FIG. 8A shows an example of the CM master 21. The CM master 21 is registered with the following information linked together:

CM number
Type
CM name
CM content
Number of seconds
Message
CM switching code
File name (when CM switching code is "1")
File name (when CM switching code is "2")
Default file
Other Here, the "CM number" is the number of the commercial and corresponds to the number of the commercial to be played to the customer registered in advance linked with the customer number of the customer CM master 22 shown in the later explained FIG. 8B. The "Type" is set as "Ringer", that is, the type of sending a commercial to a calling customer instead of the audible ringing signal of the telephone, or with "Answering service", that is, type of answering the call and sending a commercial to a calling customer instead of the conventional answering service message. The "CM name" is the name of the commercial determined by the CM number. The "CM content" is the content of the commercial determined by the CM number. The "Number of seconds" is the number of seconds during which the commercial is sent to the customer. The "Message" is the message announcing the commercial. The "CM switching code" is the code for switching the commercial, for example, "1" meaning to change it every Monday. The "File name when CM switching code is 1", "File name when CM switching code is 2", and "Default file" are the names of the files storing the commercials when the switching code is "1", "2", and default.

In this way, by registering information in the CM master 21 (the registration of all information is performed by the CM agent companies by the "processing 6"), when a calling customer (telephone number) is learned from the customer CM master 22, it is possible to generate audio based on the corresponding CM file from the CM master 21 based on the corresponding CM number and send it to the calling customer for listening or to make the customer listen to another commercial switched on for example Monday in accordance with the switching code.

FIG. 8B shows an example of the customer CM master 22. The customer CM master 22 is registered with the following information linked together:

Customer number
CM number
Rate system
Cashback amount
Other

Here, the "Customer number" is the number of the customer, usually, the telephone number. The "CM number" is the number of the commercial. The "Rate system" is either a flat rate or usage-based rate. The "Cashback amount" is the total of the cash returned to the customer.

The customer CM master 22 is registered with the CM number and rate system for each customer number, by the customers, by the "processing 5", and can update the cashback amount by the records stored in the phone usage log file 25 for each customer by the "processings 11 and 12".

FIG. 8C shows an example of the CM cashback master 23. The CM cashback master 23 is registered with the following information linked together:

CM number
Flat rate/month
Usage-based rate (amount per call)
Caller discount rate
CM agent number
Other Here, the "CM number" is the number of the commercial. The "Flat rate/month" is the rate per month when the cashback amount for the commercial of the CM number is a flat rate. The "Usage-based rate (amount per call)" is the rate per call when the cashback amount for a CM number is based on usage. The "Caller discount rate" is the caller rate used for example at step S93 of FIG. 6B explained above, that is, the coefficient used for multiplication with the usage-based rate when calculating the amount of cash to be returned when the "listened-to-end" flag is NO (phone is hung up in the middle of the commercial). The "CM agent number" is the number of the commercial agent.

The CM cashback master 23 is registered with the rate for each CM number, divided into flat rates and usage-based rates, by the CM agent companies by the "processing 8" and registered with the discount rate for the cashback service of the caller side.

FIG. 8D shows an example of the CM agent master 24. The CM agent master 24 is registered with the following information linked with each other:

CM agent number
CM agent
Name of president
Address
Name of bank
Bank account number
Other Here, the "CM agent number" is the number of the agent of the commercial. The "CM agent" is the name of the agent designated by the CM agent number (for example, FJCM Company). The "Name of president" is the name of the president of the agent of the commercial. The "Address" is the address of the agent of the commercial. The "Name of bank" and "Bank account number" are the name of the bank and the number of the bank account of the agent of the commercial.

The CM agent master 24 is registered with all information by the CM agent companies by the "processing 7".

FIG. 8E shows an example of the phone usage log file 25. The phone usage log file 25 is registered with the following information linked with each other:

Customer number
Called telephone number
CM number
"Listened-to-end" flag
Starting time
Ending time
Other The "Customer number" is the number of the customer. The "Called telephone number" is the telephone number of the called party dialed by the customer. The "CM number" is the number of the commercial. The "Listened-to-end" flag is a flag set to YES when the commercial has been listened to up to the end and NO when the phone has been hung up in the middle of the commercial. The "Starting time" and "Ending time" are the times when transmission of a commercial of the CM number starts and ends.

The phone usage log file 25 is updated (registered) with the customer numbers of the usage logs, called telephone numbers, starting times, and ending times by the "processings 1 and 3" and updated with the CM numbers obtained in accordance with the ringer or answering service use by the customer CM master 22 and CM master 21. Further, it is updated with the "listened-to-end" flags and ending times by the "processings 2 and 4".

FIG. 8F shows an example of a caller log file 26. The caller log file 26 is registered with the following information linked together:

Caller number

Cashback amount

Other

Here, the "Caller number" is the number (for example, the telephone number) of the caller. The "Cashback amount" is the amount of cash returned.

The caller log file 26 is updated with the cashback charges for exactly the amount of listening by the caller (=called telephone number) recorded in the phone usage log file 25.

As explained above, according to the present invention, it becomes possible to provide a telephone service method and telephone service apparatus which refer to a table etc. when a phone call is made and, when the number called is registered, send a message to the calling telephone and which adopt a cashback configuration and send a commercial or other message when calling up a phone and in the answering service announcement so as to thereby enabling the calling time and announcement time to be made effective use of.

While the invention has been described with reference to specific embodiments chosen for purpose of illustration, it should be apparent that numerous modifications could be made thereto by those skilled in the art without departing from the basic concept and scope of the invention.

What is claimed is:

1. A telephone service method for providing a business advertisement to a caller of a telephone comprising:

receiving a request for line connection from a telephone of a caller;

determining an identifier of the telephone of a called party for which line connection is requested;

judging whether the identifier of the called party is registered in a management table linking called party identifiers and business advertisements, wherein the management table is configured by a first master and a second master, wherein business advertisement numbers (CM No.) each corresponding to the called party identifiers are registered in the first master, and wherein the advertisements (CM content) corresponding to the business advertisement numbers (CM No.) are registered in and read from the second master so as to broadcast the advertisements to the telephone of the caller; and when judging that the identifier of the called party is registered, sending a business advertisement linked with that identifier from business advertisements registered in the second master to the telephone of the caller.

2. A telephone service method as set forth in claim 1, further comprising sending said business advertisement in place of an audible ringing signal indicating to the calling telephone that the called telephone is being called.

3. A telephone service method as set forth in claim 1, further comprising sending said business advertisement in place of an announcement message informing the caller that the called telephone cannot be connected to and prompting the caller to record a message.

4. A telephone service method as set forth in claim 1, further comprising:

providing a plurality of content for said business advertisement;

setting a switching code showing a timing for switching between said content;

judging whether content should be switched based on said switching code at the time of said request for line connection; and switching to other content different from that currently set when judging that switching is necessary.

5. A telephone service apparatus for providing a business advertisement to a caller of a telephone, comprising:

means for receiving a request for line connection from a telephone of a caller;

means for determining an identifier of the telephone of a called party for which line connection is requested;

means for judging whether the identifier of the called party is registered in a management table linking called party identifiers and business advertisements, wherein the management table is configured by a first master and a second master, wherein business advertisement numbers (CM No.) each corresponding to the called party identifiers are registered in the first master, and wherein the advertisements (CM content) corresponding to the business advertisement numbers (CM No.) are registered in and read from the second master so as to broadcast the advertisements to the telephone of the caller; and means, when judging that the identifier of the called party is registered, for sending a business advertisement linked with that identifier from business advertisements registered in the second master to the telephone of the caller.

6. A telephone service apparatus as set forth in claim 5, further comprising means for sending said business advertisement in place of an audible ringing signal indicating to the calling telephone that the called telephone is being called.

7. A telephone service apparatus as set forth in claim 5, further comprising:

means for sending said business advertisement in place of an announcement message informing the caller that the called telephone cannot be connected to; and means for prompting the caller to record a message.

8. A telephone service apparatus as set forth in claim 5, further comprising:

means for providing a plurality of content for said business advertisement;

means for setting a switching code showing a timing for switching between said content;

means for judging whether content should be switched based on said switching code at the time of said request for line connection; and means for switching to other content different from that currently set when judging that switching is necessary.

* * * * *